(12) United States Patent
Stepin et al.

(10) Patent No.: US 11,509,892 B2
(45) Date of Patent: Nov. 22, 2022

(54) APPARATUS AND METHOD FOR FILTERING IN VIDEO CODING

(71) Applicant: HUAWEI TECHNOLOGIES CO., LTD., Shenzhen (CN)

(72) Inventors: Victor Alexeevich Stepin, Moscow (RU); Sergey Yurievich Ikonin, Moscow (RU); Roman Igorevich Chernyak, Moscow (RU); Jianle Chen, San Diego, CA (US); Dmitry Yurievich Kuryshev, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/139,900

(22) Filed: Dec. 31, 2020

(65) Prior Publication Data

US 2021/0127108 A1    Apr. 29, 2021

Related U.S. Application Data

(63) Continuation of application No. PCT/RU2019/050102, filed on Jul. 2, 2019.
(Continued)

(51) Int. Cl.
*H04N 11/02* (2006.01)
*H04N 19/117* (2014.01)
(Continued)

(52) U.S. Cl.
CPC .......... *H04N 19/117* (2014.11); *G06F 1/03* (2013.01); *H04N 19/105* (2014.11);
(Continued)

(58) Field of Classification Search
CPC .. H04N 19/117; H04N 19/105; H04N 19/124; H04N 19/129; H04N 19/132;
(Continued)

(56) References Cited

U.S. PATENT DOCUMENTS 5,402,244 A    3/1995  Kim
6,748,113 B1 *  6/2004  Kondo .................. G06T 5/002
                                                       382/232
(Continued)

FOREIGN PATENT DOCUMENTS

CN    101990100 A    3/2011
CN    102474617 A    5/2012
(Continued)

OTHER PUBLICATIONS

Shen Yan-Fei et al.,"High Efficiency Video Coding",Chinese Journal of Computers,vol. 36 No. 11,Nov. 2013, total:16pages.
(Continued)

*Primary Examiner* — Jayanti K Patel
*Assistant Examiner* — Richard B Carter
(74) *Attorney, Agent, or Firm* — Huawei Technologies Co., Ltd.

(57) ABSTRACT

A filter for video coding is provided, where the filter is configured for processing a block for generation of a filtered block, and the block comprises a plurality of pixels. The filter includes one or more processor configured to: scan, according to a predefined scan template, to obtain a current pixel of the block and its neighboring pixels of the current pixel; obtain spectrum components by performing transform for the current pixel and its neighboring pixels; obtain filtered spectrum components based on a filtering parameter and the spectrum components; obtain filtered pixels by performing inverse transform for the filtered spectrum components; and generate a filtered block based on the filtered pixels. The filter is provided allowing improving the efficiency for video coding.

20 Claims, 26 Drawing Sheets

Related U.S. Application Data

(60) Provisional application No. 62/793,866, filed on Jan. 17, 2019, provisional application No. 62/757,732, filed on Nov. 8, 2018, provisional application No. 62/735,722, filed on Sep. 24, 2018, provisional application No. 62/731,972, filed on Sep. 17, 2018, provisional application No. 62/731,967, filed on Sep. 16, 2018, provisional application No. 62/725,845, filed on Aug. 31, 2018, provisional application No. 62/693,441, filed on Jul. 2, 2018.

(51) Int. Cl.
*H04N 19/124* (2014.01)
*H04N 19/132* (2014.01)
*H04N 19/159* (2014.01)
*H04N 19/176* (2014.01)
*H04N 19/61* (2014.01)
*H04N 19/82* (2014.01)
*H04N 19/105* (2014.01)
*H04N 19/129* (2014.01)
*H04N 19/60* (2014.01)
*G06F 1/03* (2006.01)
*H04N 19/80* (2014.01)

(52) U.S. Cl.
CPC ......... *H04N 19/124* (2014.11); *H04N 19/129* (2014.11); *H04N 19/132* (2014.11); *H04N 19/159* (2014.11); *H04N 19/176* (2014.11); *H04N 19/60* (2014.11); *H04N 19/61* (2014.11); *H04N 19/80* (2014.11); *H04N 19/82* (2014.11)

(58) Field of Classification Search
CPC .... H04N 19/159; H04N 19/176; H04N 19/60; H04N 19/61; H04N 19/80; H04N 19/82; G06F 1/03
USPC .......... 375/240.03, 240.12, 240.13; 382/232, 382/233
See application file for complete search history.

(56) References Cited

U.S. PATENT DOCUMENTS

| | | | |
|---|---|---|---|
| 8,514,943 B2 | 8/2013 | Lee et al. | |
| 2006/0133683 A1 | 6/2006 | Srinivasan | |
| 2008/0013839 A1* | 1/2008 | Kimura | H04N 19/192 382/233 |
| 2008/0152005 A1* | 6/2008 | Oguz | H04N 19/59 375/240.12 |
| 2013/0051467 A1* | 2/2013 | Zhou | H04N 19/105 375/240.13 |
| 2013/0128957 A1 | 5/2013 | Bankoski et al. | |
| 2013/0170745 A1 | 7/2013 | Masuda | |
| 2013/0343447 A1 | 12/2013 | Chen et al. | |
| 2014/0286392 A1 | 9/2014 | Lim et al. | |
| 2015/0281731 A1 | 10/2015 | Kadono et al. | |
| 2016/0014425 A1 | 1/2016 | Hinz et al. | |
| 2016/0316214 A1 | 10/2016 | Gisquet et al. | |
| 2017/0155905 A1 | 6/2017 | Puri et al. | |
| 2017/0237939 A1 | 8/2017 | Han et al. | |
| 2017/0339419 A1 | 11/2017 | Chuang et al. | |
| 2018/0176557 A1* | 6/2018 | Ichigaya | H04N 19/124 |
| 2019/0289301 A1* | 9/2019 | Lim | H04N 19/105 |

FOREIGN PATENT DOCUMENTS

| | | |
|---|---|---|
| CN | 105791865 A | 7/2016 |
| EP | 2192786 A1 | 6/2010 |
| EP | 2563020 B1 | 8/2015 |
| RU | 2565499 C2 | 10/2015 |
| WO | 2018117896 A1 | 6/2018 |
| WO | 2018117938 A1 | 6/2018 |

OTHER PUBLICATIONS

Jeongyeon Lim et al., 1D-DCT based frequency domain adaptive loop filter (FD-ALF). Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G666, 12 pages.
Sergey Ikonin et al., CE14: Hadamard transform domain filter (Test 3). Joint Video Experts Team (JVET) of ITU-T SG 16 WP 3 and ISO/IEC JTC 1/SC 29/WG 11, 12th Meeting: Macao, CN, Oct. 3-12, 2018, JVET-L326-v3, 15 pages.
Victor Stepin et al., CE2 related: Hadamard Transform Domain Filter. JVET-K0068, Aug. 1, 2018, 8 pages.
Qian Chen et al., Classified quadtree-based adaptive loop filter. 2011 IEEE International Conference on Multimedia and Expo, Sep. 6, 2011, 6 pages.
U.S. Appl. No. 62/693,441, filed Jul. 2, 2018, 31 pages.
Victor Stepin et al., CE2 related: Hadamard Transform Domain Filter. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0068-v3, 5 pages.
Per Wennersten et al., Bilateral Filtering for Video Coding. IEEE VCIP 17, Dec. 10-13, 2017, 4 pages.
JVET-J0025_v2, Huanbang Chen et al:"Description of SDR, HDR and 360 video coding technology proposal by Huawei, GoPro, HiSilicon, and Samsung", [online], version 4, Apr. 14, 2018, Joint Video Exploration Team (JVET) of ITU-T SG 16 WP 3 and ISO/IEC JTC 1/SC 29/WG 11, total 19 pages.
Document: JVET-J1022_r2, Li Zhang et al, Description of Core Experiment 2 (CE2) on In-Loop Filters, Joint Video Experts Team (JVET) of ITU-T SG 16 WP 3 and ISO/IEC JTC 1/SC 29/WG 11, 10th Meeting: San Diego, US, Apr. 10-20, 2018, total 32 pages.

* cited by examiner

APPARATUS AND METHOD FOR FILTERING IN VIDEO CODING

CROSS-REFERENCE TO RELATED APPLICATIONS

This application is a continuation of International Application No. PCT/RU2019/050102, filed on Jul. 2, 2019, which claims the benefit of U.S. Provisional Application No. 62/693,441, filed on Jul. 2, 2018 and U.S. Provisional Application No. 62/725,845, filed on Aug. 31, 2018 and U.S. Provisional Application No. 62/731,967, filed on Sep. 16, 2018 and U.S. Provisional Application No. 62/731,972, filed on Sep. 17, 2018 and U.S. Provisional Application No. 62/735,722, filed on Sep. 24, 2018 and U.S. Provisional Application No. 62/757,732, filed on Nov. 8, 2018 and U.S. Provisional Application No. 62/793,866, filed on Jan. 17, 2019, The disclosures of the aforementioned applications are hereby incorporated by reference in their entireties.

TECHNICAL FIELD

Generally, the present invention relates to the field of video coding. More specifically, the present invention relates to a filter for video coding, method for filtering reconstructed video frames, and method for filtering video blocks as well as an encoding apparatus and a decoding apparatus comprising such the filter for video coding.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

As there is a continuous need for improving quality and reducing bandwidth requirements, solutions that maintain the quality with reduced bandwidth requirements or improve the quality while maintaining the bandwidth requirement are continuously searched. Furthermore, sometimes compromises may be acceptable. For example, it may be acceptable to increase the bandwidth requirements if the quality improvement is significant.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Image filtering is frequently used to emphasize certain features of an image or to enhance the objective or perceptual quality of the filtered image. Image filtering has to deal with various sources of noise. Accordingly, various approaches for quality enhancement have been proposed and are currently in use. For example, in an adaptive Loop filter (ALF) method, each reconstructed frame is divided into a set of small blocks (super-pixels) and each block is filtered by the adaptive loop filter in that each pixel of the filtered reconstructed frame is a weighted sum of several pixels in the connected area of the pixel from the reconstructed frame around the position of the generating filtered pixel. Weighting coefficients (also referred to as filter coefficients) have property of central symmetry and are transmitted from the encoder to the decoder side. Edges often have a big size and therefore the number of transmitted weighting coefficients can become too large for an efficient processing. A large number of weighting coefficients requires a complex rate-distortion optimization (RDO) at the encoder side for decreasing the number of weighting coefficients for transmission. On the decoder side ALF requires implementation of universal multipliers and these multipliers should be reloaded for each 2×2 pixel block.

Thus, there is a need for an improved filter and method allowing to improve the prediction quality with low complexity and, thus, increase the video coding efficiency.

SUMMARY

It is an object of the invention to provide an improved filter and method allowing to improve the filtering efficiency with limited complexity and, thus, increase the video coding efficiency.

The foregoing and other objects are achieved by the subject matter of the independent claims. Further implementation forms are apparent from the dependent claims, the description and the figures.

According to a first aspect the invention relates to a filter for video coding, wherein the filter is configured for processing a block for generation of a filtered block, wherein the block comprises a plurality of pixels. The filter includes a memory storage comprising instructions; and one or more processor in communication with the memory. The one or more processors executes the instructions to: load a current pixel and its neighboring pixels to a linear buffer according to a predefined scan template; obtain spectrum components by performing 1D transform for pixels in the linear buffer; obtain filtered spectrum components by multiplying each spectrum component with a gain coefficient, wherein the gain coefficient depends on a corresponding spectrum component and a filtering parameter; obtain filtered pixels by performing inverse 1D transform for filtered spectrum components; and generate the filtered block based on the filtered pixels.

As an example, the block (or frame) may be a predicted block, and the filtered block is a filtered predicted block. As another example, the block (or frame) may be a reconstructed block, and the filtered block is a filtered reconstructed block.

As an example, the gain coefficient is a function of the corresponding spectrum component and the filtering parameter. The filtering parameter may be derived from a codec quantization parameter (QP).

An another example, a first spectrum component is bypassed without filtering when the gain coefficient G (i, σ) for the first spectrum component is equal to one. The first spectrum component corresponds to sum or average value of samples in the linear buffer, and the first spectrum component may correspond to DC.

As other example, wherein the one or more processors executes the instructions to: drop N bits from table values of the LUT, N is an integer. N may be dependent on QP value, or is a fixed value.

As an example, the predefined scan template is defined as set of spatial or raster offsets relative to a position of the current pixel inside the reconstructed block. Offsets point to neighbour pixels are inside the reconstructed block. At least one filtered pixel may be placed to its original position according to the predefined scan template. When all filtered pixels are added to an accumulation buffer according to the predefined scan template, and the accumulation buffer could be initialized by zero before the obtaining filtered spectrum components. When final filtered pixels are obtained as accumulated values in the accumulation buffer divided by number of pixels adding to a current position of the accumulation buffer; one or more processor is configured to generate the filtered reconstructed block based on the final filtered pixels.

Optionally, differences between all filtered and corresponding unfiltered pixels are added to an accumulation buffer according to the predefined scan template, and the accumulation buffer could initialized by unfiltered pixels multiplied by maximum number of pixel values to be added in the block. The final filtered pixels are obtained as accumulated values in the accumulation buffer divided by maximum number of pixel values to be added in the block.

According to a second aspect the invention relates to a corresponding filtering method for processing a block for generation of a filtered block, wherein the block comprises a plurality of pixels. Each pixel is associated with a pixel value. The filtering method comprises the steps of: loading a current pixel and its neighboring pixels to a linear buffer according to a predefined scan template; obtaining spectrum components by performing 1D transform for pixels in the linear buffer; obtaining filtered spectrum components by multiplying each spectrum component with a gain coefficient, wherein the gain coefficient depends on a corresponding spectrum component and a filtering parameter; obtaining filtered pixels by performing inverse 1D transform for filtered spectrum components; and generating the filtered block based on the filtered pixels.

As an example, the block (or frame) may be a predicted block, and the filtered block is a filtered predicted block. As another example, the block (or frame) may be a reconstructed block, and the filtered block is a filtered reconstructed block.

As an example, the gain coefficient is a function of the corresponding spectrum component and the filtering parameter. The filtering parameter may be derived from a codec quantization parameter (QP).

An another example, a first spectrum component is bypassed without filtering when the gain coefficient G (i, σ) for the first spectrum component is equal to one. The first spectrum component may correspond to DC value.

As other example, filtering of the spectrum components based on a look up table (LUT). LUT generation may be based on an auxiliary function for at least some quantization parameters (QPs). The auxiliary function may be a straight line equation comming over points (i,THR) and (α, 0), where α>0 and a depends on filtering parameter σ or QP value. For example, for the last QP in a set of QPs, α equals to 11; or for the second last QP in the set of QPs, α equals to 9.

As other example, the method further includes: dropping N bits from table values of the LUT, N is an integer. N may be dependent on QP value, or is a fixed value. When N is selected less for lower QP in comparison to higher QP from the set of QPs, for example, for the first QP in the set of QPs, N is equal to 2; or for the rest QPs from the set of QPs, N is equal to 3. Alternatively, when N is selected higher for higher QP in comparison to lower QP from the set of QPs of QPs, for example, for the last QP or for the last two QPs in the set of QPs, N is equal to 4; or for the rest QPs from the set of QPs, N is equal to 3. Alternatively, when N is selected less for lower QP and higher for higher QP in comparison to the rest QP from the set of QPs, for example, for the first QP in the set of QPs, N is equal to 2; for the last QP or for the last two QPs in the set of QPs, N is equal to 4; or, for the rest QPs from the set of QPs, N is equal to 3.

As an example, the predefined scan template is defined as set of spatial or raster offsets relative to a position of the current pixel inside the reconstructed block. Offsets point to neighbour pixels are inside the reconstructed block. At least one filtered pixel may be placed to its original position according to the predefined scan template. When all filtered pixels are added to an accumulation buffer according to the predefined scan template, and the accumulation buffer could be initialized by zero before the obtaining filtered spectrum components. When final filtered pixels are obtained as accumulated values in the accumulation buffer divided by number of pixels adding to a current position of the accumulation buffer; one or more processor is configured to generate the filtered reconstructed block based on the final filtered pixels.

Optionally, differences between all filtered and corresponding unfiltered pixels are added to an accumulation buffer according to the predefined scan template, and the accumulation buffer could initialized by unfiltered pixels multiplied by maximum number of pixel values to be added in the block. The final filtered pixels are obtained as accumulated values in the accumulation buffer divided by maximum number of pixel values to be added in the block.

According to a third aspect the invention relates to an encoding apparatus for encoding a current frame from an input video stream, wherein the encoding apparatus comprises a filter according to the first aspect of the invention.

According to a fourth aspect the invention relates to a decoding apparatus for decoding a current frame from a received bitstream, wherein the decoding apparatus comprises a filter according to the first aspect of the invention.

According to a fifth aspect the invention relates to a computer program comprising program code for performing the method according to the second aspect when executed on a computer.

Thus, the filter is provided allowing improving the efficiency for video coding. More specifically, the improved filter according to embodiments of the invention estimates filter parameters from the frame itself without filter parameters signaling and, therefore, requires significantly less signaling than conventional filters, which signal weight coefficients for filtering in the image domain.

BRIEF DESCRIPTION OF THE DRAWINGS

Further embodiments of the invention will be described with respect to the following figures, wherein.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
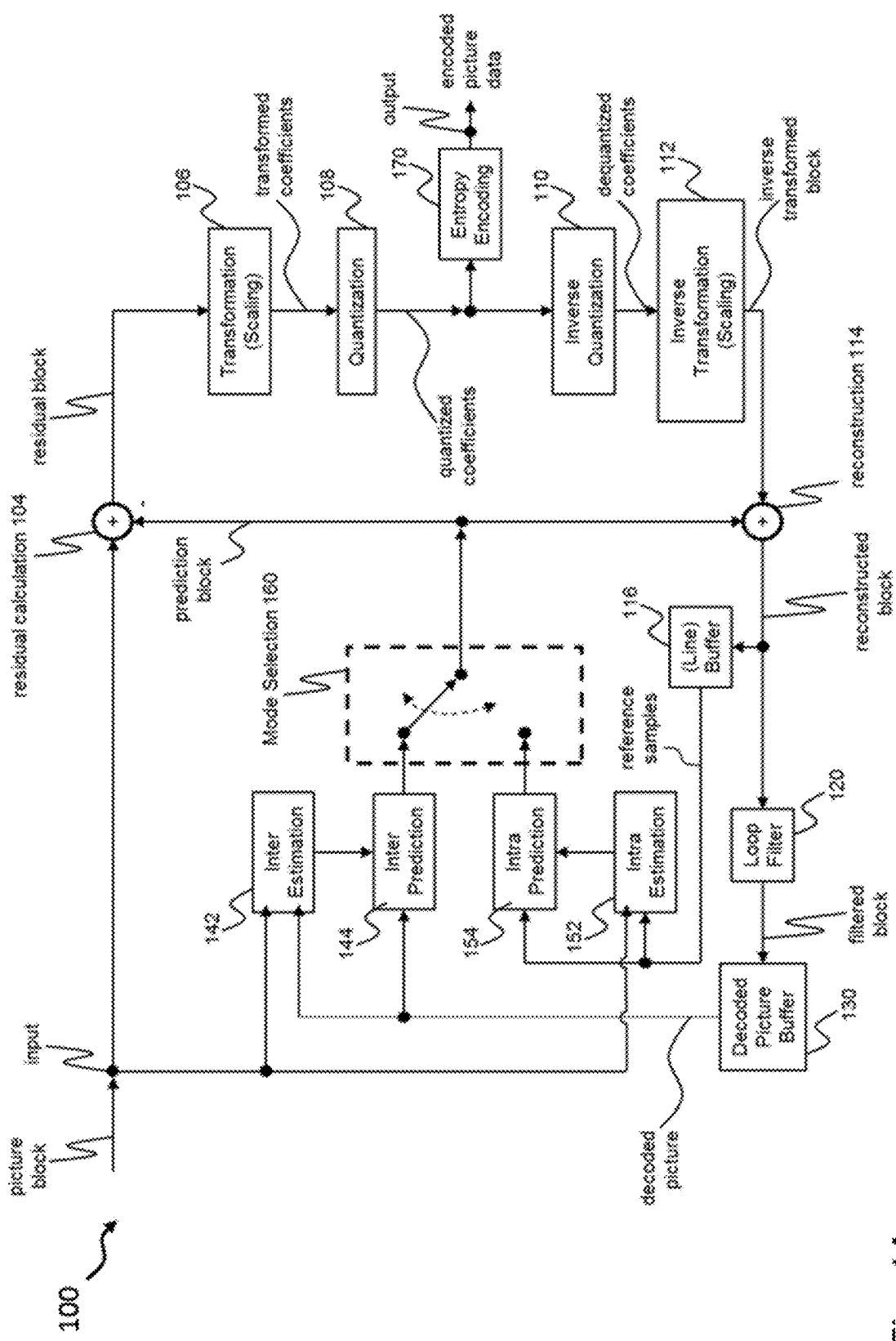
FIG. 1A shows a schematic diagram illustrating an encoding apparatus according to an embodiment comprising a filter according to an embodiment.

FIG. 1A shows an encoding apparatus 100 according to an embodiment comprising a filter 120 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ.

In the exemplary embodiment shown in FIG. 1A, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 1A comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. To this end, the encoding apparatus 100 shown in FIG. 1A further comprises an inter prediction unit 144. Generally, the inter prediction unit 144 can be configured to perform motion compensation of a block based on motion estimation provided by the inter estimation unit 142.

Figure 1B:
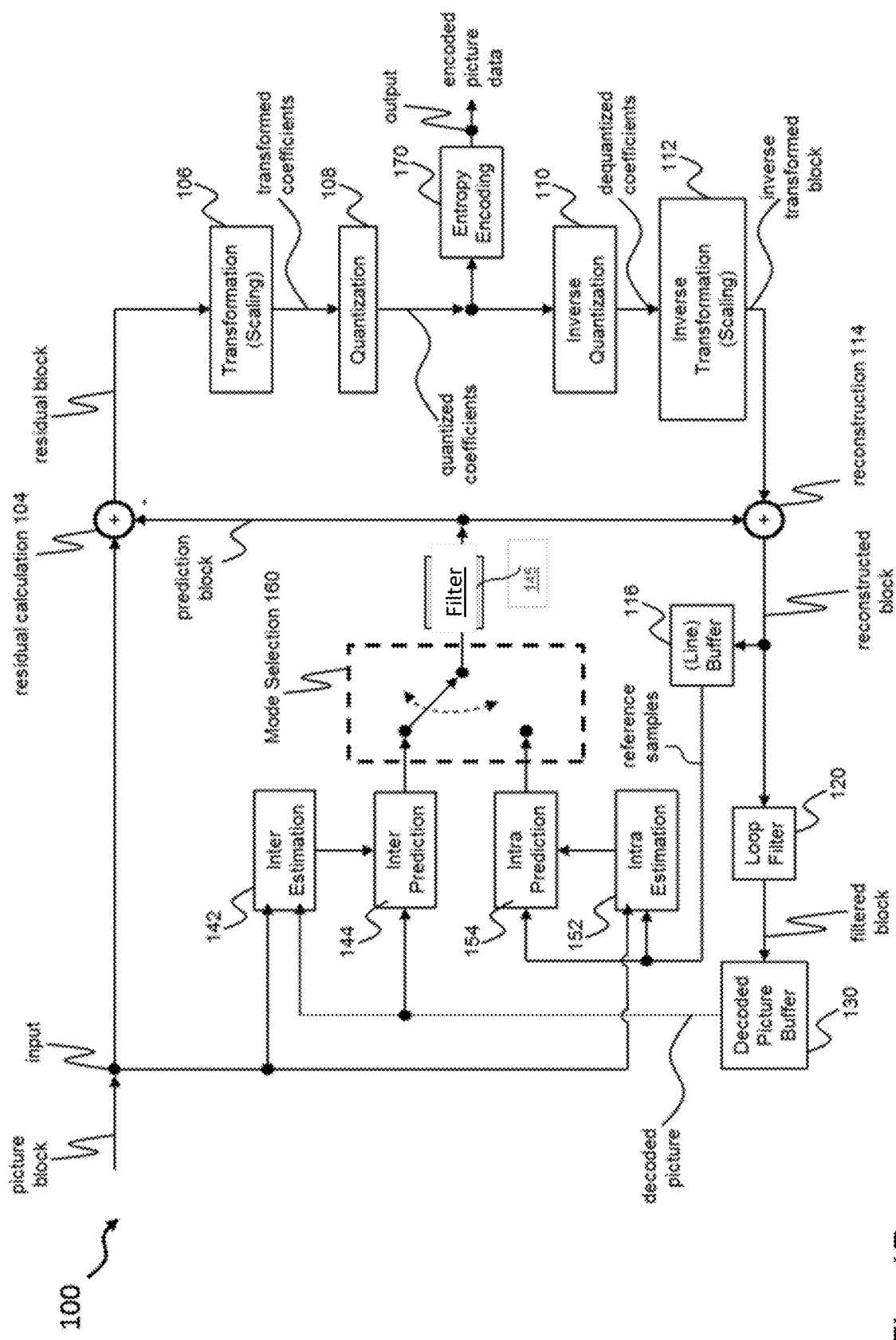
FIG. 1B shows a schematic diagram illustrating an encoding apparatus according to an embodiment comprising a filter according to an embodiment.

Furthermore, the prediction signal in the hybrid encoder embodiment shown in FIG. 1B obtain from intra or inter prediction is further filtered by filter 145.

Furthermore, in the hybrid encoder embodiment shown in FIGS. 1A and 1B a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the intra prediction unit 154, the inter prediction unit 144 and the filter 120 are further encoded by an entropy encoding unit 170.

A hybrid video encoder usually duplicates the decoder processing such that both will generate the same predictions.

Thus, in the embodiment shown in FIG. 1 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by the filter 120, which will be described in more detail below. The final picture is stored in the decoded picture buffer 130 and can be used for the inter prediction of subsequent frames.

Figure 2A:
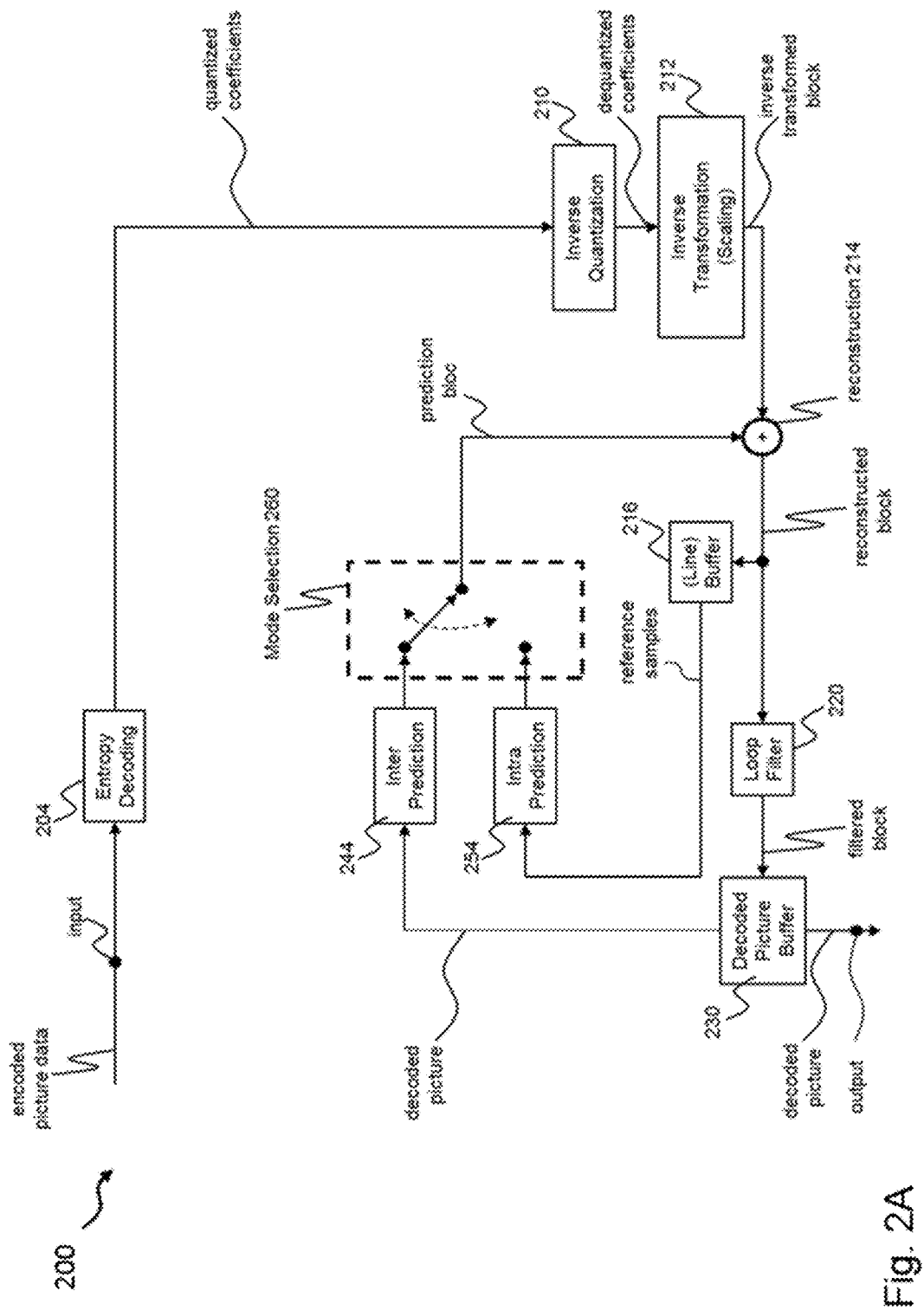
FIG. 2A shows a schematic diagram illustrating a decoding apparatus according to an embodiment comprising a filter according to an embodiment.

FIG. 2A shows a decoding apparatus 200 according to an embodiment comprising a filter 220 according to an embodiment. The decoding apparatus 200 is configured to decode a block of a frame of an encoded video signal. In the embodiment shown in FIG. 2A the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for an intra prediction unit 254 and an inter prediction unit 244 as well as other components of the decoding apparatus 200, such as the filter 220. Generally, the intra prediction unit 254 and the inter prediction unit 244 of the decoding apparatus 200 shown in FIG. 2A are selected by a mode selection unit 260 and function in the same way as the intra prediction unit 154 and the inter prediction unit 144 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the filter 220 for inter prediction.

Figure 2B:
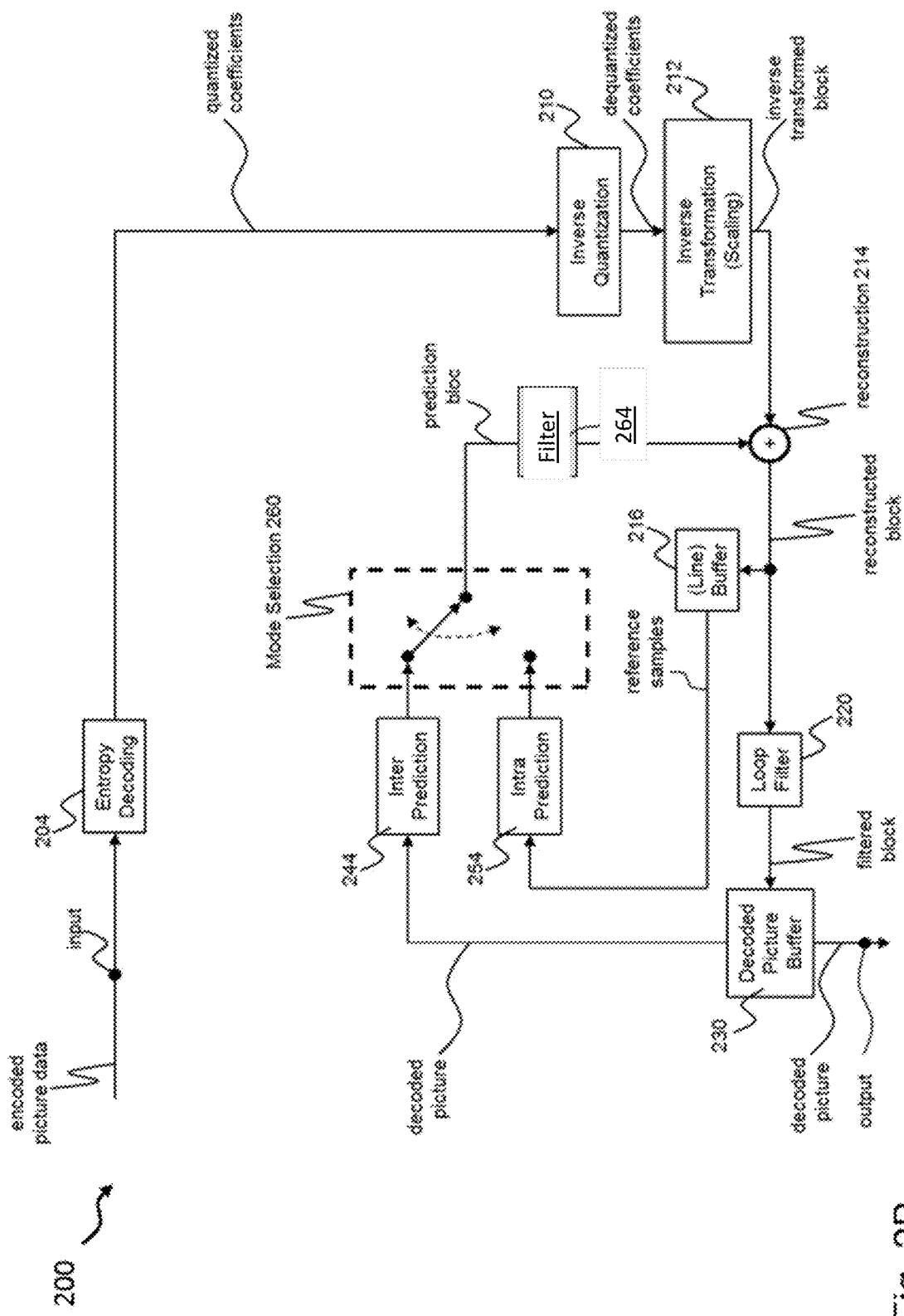
FIG. 2B shows a schematic diagram illustrating a decoding apparatus according to an embodiment comprising a filter according to an embodiment.

As shown in FIG. 2B, the prediction signal in the hybrid decoder embodiment shown in FIG. 2B obtain from intra or inter prediction is further filtered by filter 264.

As already described above, the filter 120, 220 may be used at a frame level, for example, the filter 120, 220 may be configured to process a reconstructed frame from a decoded reconstructed video stream for generating a filtered reconstructed frame, where the reconstructed frame includes a plurality of blocks. The filter 120, 220 may be also used at a block level immediately after block reconstruction without waiting for a whole frame, for example, the filter 120, 220 may be configured to process a reconstructed block for generating a filtered reconstructed block, where the reconstructed block includes a plurality of pixels.

The filter 120, 220, 145 or 264 comprises one or more processor (or one or more processing unit). As will be explained in more detail below, the one or more processor (or one or more processing unit) is configured to: load a current pixel and its neighboring pixels to a linear buffer according to a predefined scan template (in other words, scan order, or scan pattern); obtain spectrum components by performing 1D transform for each pixel in the linear buffer; obtain filtered spectrum components by multiplying each spectrum component with a gain coefficient, wherein the gain coefficient depends on a corresponding spectrum component and a filtering parameter; obtain filtered pixels by performing inverse 1D transform for filtered spectrum; and generate a filtered reconstructed block based on the filtered pixels estimated on previous processing steps. In an example, the gain coefficient depends on a corresponding spectrum component and a filtering parameter. In another example, the gain coefficient depends on one or more filtering parameters and one or more corresponding spectrum components. In other example, the respective gain coefficient may depend on one or more filtering parameters and the corresponding spectrum component as well as neighboring spectral components to the left and to the right of the spectrum component.

The disclosure describes in-loop filter for lossy video codec which performs local and/or non-local filtering of reconstructed block from reconstructed frame. According to an example, the reconstructed frame is divided into set of small non-overlapped rectangular blocks (CU blocks). On the next step each reconstructed block (reconstructed CU block) is filtered in frequency domain independently from other reconstructed blocks. The filter can also be applied after transform and reconstruction, and the filtered result is used both for output as well as for spatial and temporal prediction.

As another example, the disclosure describes prediction filter for lossy video codec which performs local and/or non-local filtering of prediction block of reconstructed frame.

At the first step of processing all pixels inside reconstructed block can be processed independently from each other. For processing of pixel $r(0)$, neighboring pixels are used. For example, as illustrated on FIG. 3A, pixels $r(1)$ to $r(7)$ are used, and pixels $r(0)$ to $r(7)$ form one processing group.

Figure 3A:
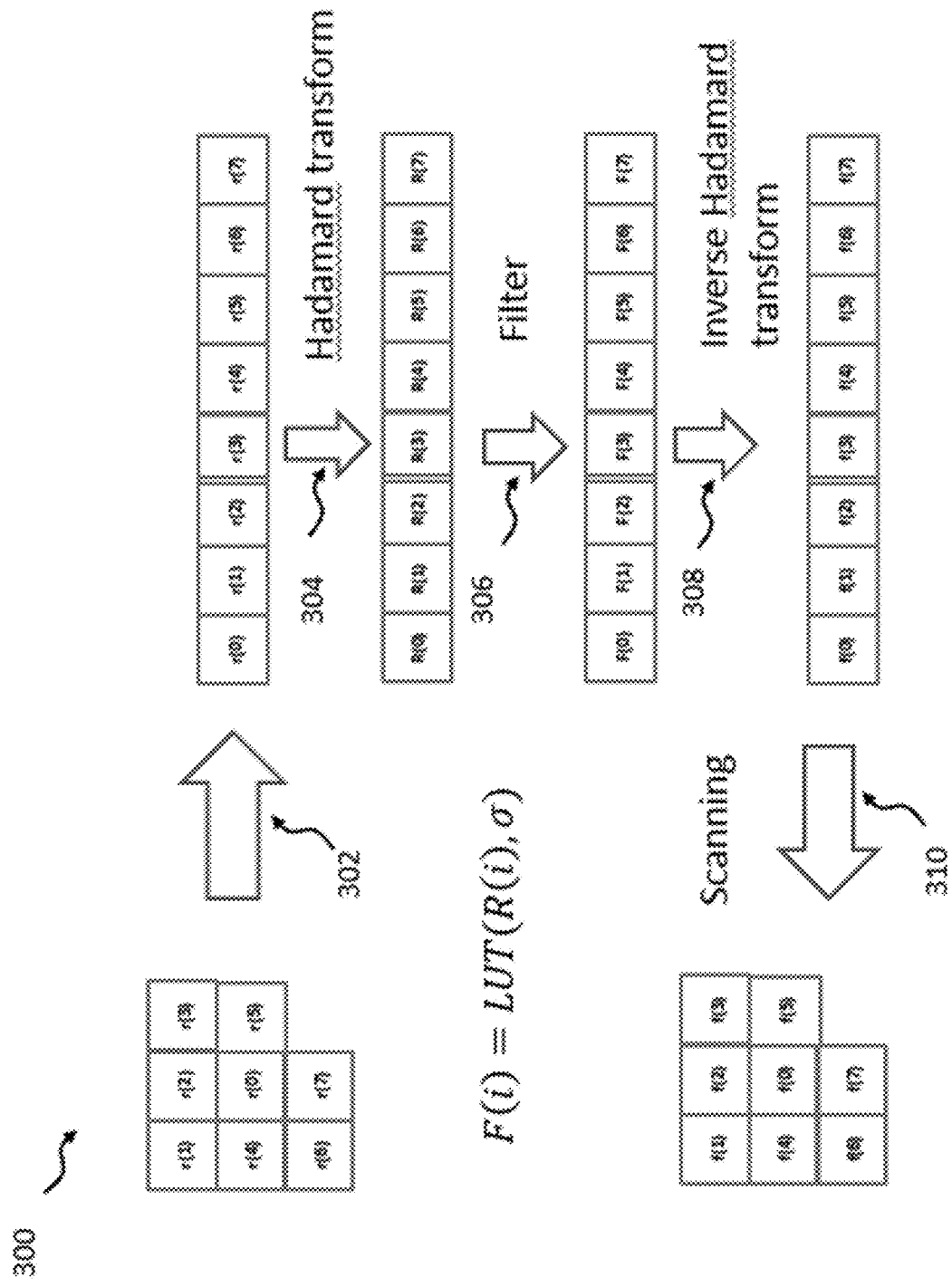
FIG. 3A shows a schematic diagram illustrating aspects of a filtering process implemented in a filter according to an embodiment.
Figure 3B:
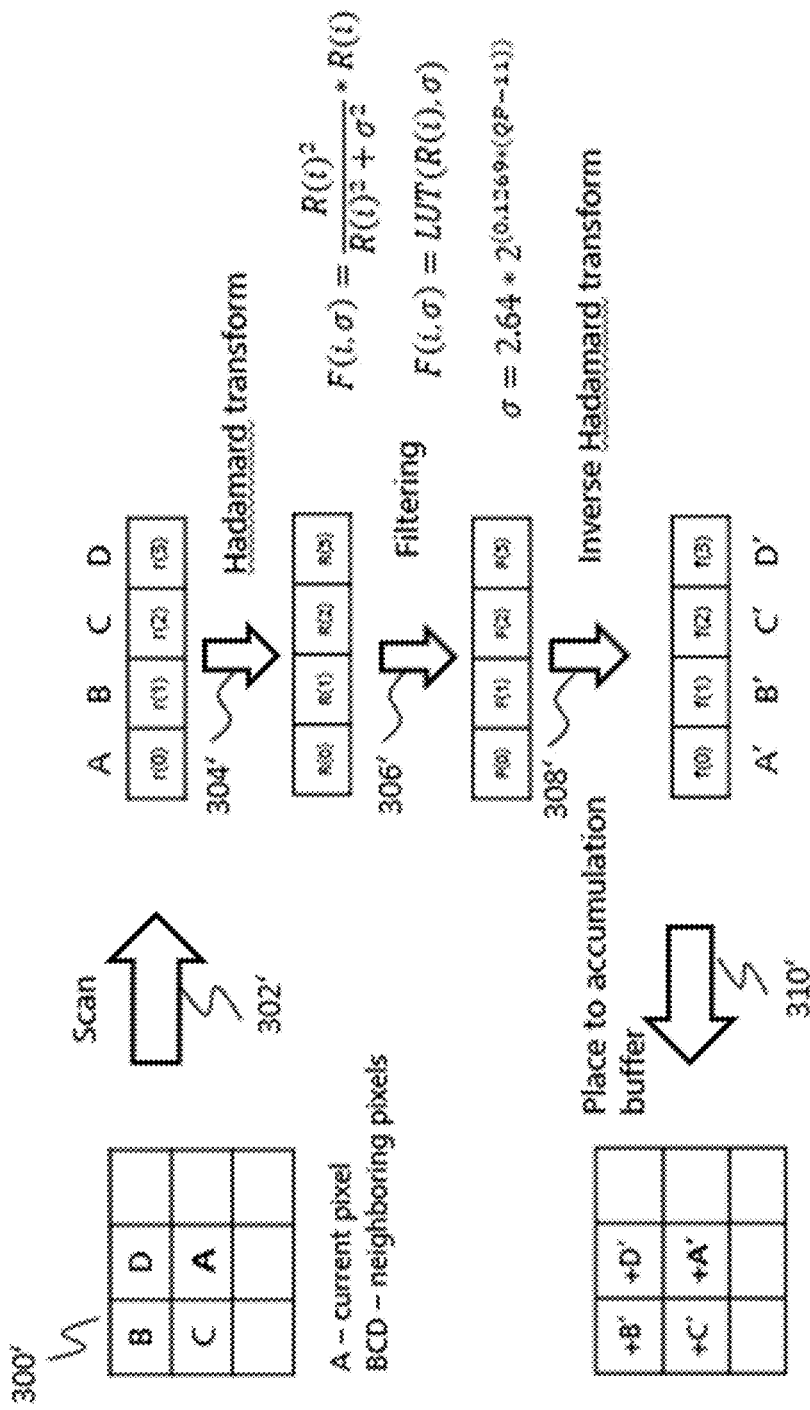
FIG. 3B shows a schematic diagram illustrating aspects of a filtering process implemented in a filter according to an embodiment.

FIG. 3A or 3B shows a schematic diagram 300, 300' illustrating aspects of a filtering process implemented in a filter according to an embodiment. At step 302, 302', a current pixel and its neighboring pixels from a block are loaded to a linear buffer according to a predefined scan template. As an example, the block may be a predicted block. As another example, the block may be a reconstructed block.

At step 304, 304', 1D transform is performed for pixel $r(0)$ and its neighboring pixels $r(1)$ to $r(7)$ in the linear buffer to obtain spectrum components R:

$$R = 1D\_Transform(r)$$

As an example, the 1D transform may be a Hadamard transform.

It should be understood that whether to perform 1D transform on 4 pixels in the row (e.g. pixels A, B, C, D as in example on FIG. 3B) or perform 2D transform to spatially located pixels A, B, C, D relates to implementation specific. Applying 2D transform on 4 pixels A, B, C, D located in 2×2 block can lead to same result as applying 1D transform to 4 pixels A, B, C, D being taken as a row. At step 306, 306', filtering is performed in frequency domain based on multiplication of each spectrum component $R(i)$ by a corresponding gain coefficient $G(i, \sigma)$ to obtain a filtered spectrum components $F(i)$:

$$F(i) = R(i) * G(i, \sigma) \qquad (1)$$

The set of gain coefficients for all spectrum components is frequency impulse response of the filter.

In an example, the gain coefficient depends on a corresponding spectrum component and a filtering parameter. In another example, the gain coefficient depends on one or more filtering parameters and one or more of the corresponding spectrum components. In other examples, the respective gain coefficient may depend on the one or more filtering parameters and the corresponding spectrum component as well as neighboring spectral components to the left and to the right of the spectrum component. If each gain coefficient is a function of spectrum component of the reconstructed block and the filtering parameter, or is a function of spectrum component of the predicted block and the filtering parameter, the gain coefficient G(i, σ) can be described by the following formula as an example:

$$G(i, \sigma) = \frac{R(i)^2}{R(i)^2 + m * \sigma^2} \quad (2)$$

where (i) is an index of a spectrum component, R(i) is the spectrum component corresponding to (i) index, G(i, σ) is the gain coefficient corresponding to R(i), σ is the filtering parameter, m is a normalization constant equal to the number of spectrum components. For example, m is 1, 2, 3, 4 . . . . Different spectrum components may have a same gain coefficient, or may have different gain coefficients.

For those transforms that have spectrum components corresponding to average (FFT, DCT, DST etc.) or sum (Hadamard) of input samples of the transform block (usually first component corresponding to DC value) it may be advantageous to have filtering coefficient equal to 1 to avoid changing of average luminance of the filtered block. That means bypassing (no filtering) for first spectrum component corresponding to DC value.

σ as the filtering parameter, may be deriving from codec quantization parameter (QP) on the encoder and decoder sides, for example, using the following formula:

$$\sigma = k * 2^{(n*(QP-s))} \quad (3)$$

, wherein k, n and s are constants having values as example: k=2.64, n=0.1296, s=11. Different spectrum components may have a same filtering parameter, or may have different filtering parameters.

Parameters k, n and s can be selected in a such way to make sigma dependent on quantization step size that doubles each time the QP value increases by 6 in latest video coding standards. In example with parameters k=0.5, n=⅙ and s=0 the σ parameter is derived as follows:

$$\sigma = 0.5 * 2^{\left(\frac{QP}{6}\right)} \quad (3')$$

Quantization scaling matrices are widely used to improve video compression quality. In this method quantization step size derived based on QP is multiplied by scaling factor transmitted in bitstream. For such method σ parameters derivation may be based on actual scaled quantization step size used for certain QP:

$$\sigma = k * \text{Quantization\_step\_size}(QP-s) \quad (4)$$

Constants k, n and s may have a fixed values for σ calculation, or may have different values depending on QP, block size and shape, type of prediction (inter/intra) for current block. For example for intra predicted square blocks with size 32×32 or more parameter s may be calculated as s=11+8=19. As equivalent filter parameter σ has smaller value that leads to softer filter which is more suitable for big square intra-predicted blocks usually corresponding to flat regions. As another example, k may be modified based on bit depth of pixels $k_{mod} = k*(1<<(bit\_depth-8))$ According to the method 300, 300', gain coefficient for each frequency is derived from spectrum component of the reconstructed pixels or predicted pixels. Therefore, the method 300, 300' do not need transmission of filtering parameters and can be applied for any reconstructed block or predicted block without additional signaling.

The LUT details are discussed.

It can be noted that filtering implies multiplication of spectrum component R(i) on scaling coefficient which is always less than 1. It can also be observed that at high values of R(i) scaling coefficient is close to 1. Based on these observation spectrum filtering is implemented using lookup table that allows to exclude multiplications and division from filtering operations.

Spectrum gain coefficient is less 1, so filtering can be implemented based on short look up table (LUT) reading according to the following formulas:

$$F(i, \sigma) = \begin{cases} R(i), & \text{Abs}(R(i)) \geq THR \\ LUT(R(i), \sigma), & R(i) > 0 \\ -LUT(-R(i), \sigma), & R(i) \leq 0 \end{cases} \quad (5)$$

where $$LUT(R(i), \sigma) = \frac{R(i)^3}{R(i)^2 + m * \sigma^2}. \quad (i)$$

is an index of a spectrum component, R(i) is the spectrum component corresponding to (i) index, σ is the filtering parameter, and THR is a threshold, m is normalization constant equal to the number of spectrum components. For example, m is 1, 2, 3, 4 . . . .

As an example, THR may be calculated from following formula, $$\frac{THR^2}{THR^2 + m * \sigma^2} = C \quad (6)$$

where C is a value close to 1, for example, 0.8 or 0.9. To reduce LUT size threshold THR may be dependent from QP value.

For further reducing LUT size second threshold may be introduced to replace small filtered values by zero. In that case the filtered spectrum component is F(i, σ) is further derived as:

$$F(i, \sigma) = \begin{cases} R(i), & \text{Abs}(R(i)) > THR \\ 0, & \text{Abs}(R(i)) < THR2 \\ LUT(R(i), \sigma), & R(i) > 0 \\ -LUT(-R(i), \sigma), & R(i) \leq 0 \end{cases} \quad (7)$$

Wherein THR2 defines the threshold below that filtered spectrum component is considered to be zero. The second THR2 can also be defined as depending on QP value.

After filtering in frequency domain, inverse 1D transform is performed for filtered spectrum component at step 308 to obtain filtered pixels f:

$$f = 1D\_Inverse\_Transform(F) \quad (8)$$

At step 310, 310', the result of inverse 1D transform is placed to linear buffer of filtered reconstructed pixels or filtered pixels.

At step 312, 312' (not shown in FIG. 3A or 3B), a filtered block is generated based on the filtered pixels estimated on previous processing steps. As an example, the filtered block may be a filtered predicted block. As another example, the filtered block may be a filtered reconstructed block.

As shown in FIG. 3A as an embodiment, after filtering step 306, the filtered pixel f(0) is placed to its original position according to the predefined scan template. Other filtered samples f(1)–f(7) are not used. At another embodiment, more than one filtered pixels, for example, all filtered pixels from linear buffer of filtered samples are added to an accumulation buffer according to the predefined scan template used at step 302 of FIG. 3A. The accumulation buffer should be initialized by zero before the filtering step. At the last normalization step, final filtered pixels are obtained as accumulated values in the accumulation buffer divided by number of pixels added to a current position of the accumulation buffer, in other words, the number of pixels values added to current position of accumulation buffer on previous processing steps. Then the filtered reconstructed block or the predicted block is generated based on the final filtered pixels.

As another embodiment, a filter has same implementation both for intra and inter coding unit (CU) filtering.

Hadamard transform domain filter is always applied to luma reconstructed blocks with non-zero transform coefficients, excluding 4×4 blocks and if slice quantization parameter is larger than 17. The filter parameters are explicitly derived from the coded information. Proposed filter, if applied, is performed on decoded samples right after block reconstruction. The filtered result is used both for output as well as for spatial and temporal prediction.

Figure 3C:
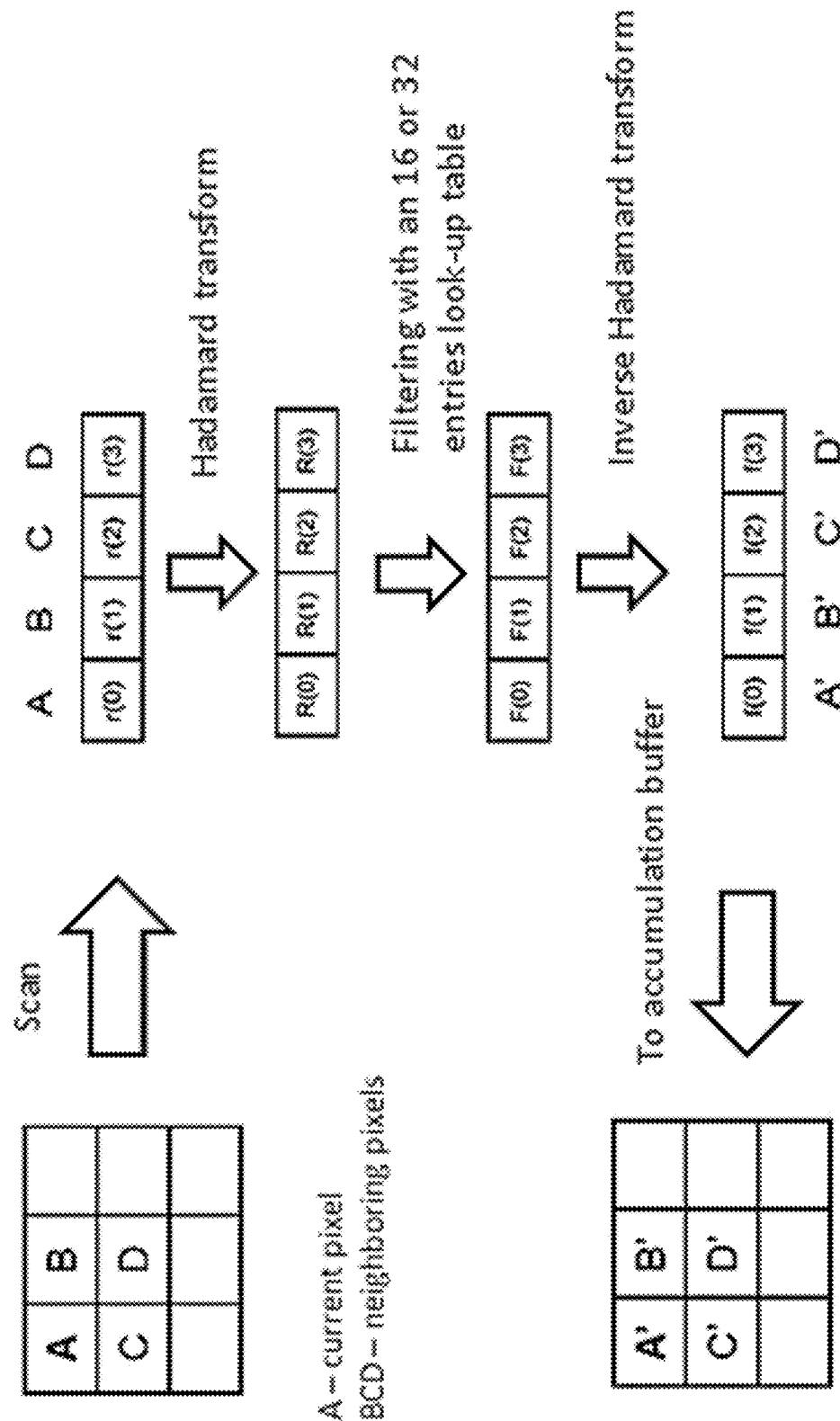
FIG. 3C shows a schematic diagram illustrating aspects of a filtering process implemented in a filter according to another embodiment.

The filtering process is discussed, as schematically presented on FIG. 3C.

For each pixel from reconstructed block pixel processing comprises the following steps:

Scan for 4 neighboring pixels around processing pixel including current one according to scan pattern.

4 point Hadamard transform of read pixels.

Spectrum filtering based on the formula (1) and (2).

The first spectrum component corresponding to DC value is bypassed without filtering.

Inverse 4 point Hadamard transform of filtered spectrum.

After filtering step the filtered pixels are placed to its original positions into accumulation buffer.

After completing filtering of pixels the accumulated values are normalized by number of processing groups used for each pixel filtering. Due to use of padding of one sample around the block number of processing groups is equal to 4 for each pixel in the block and normalization is performed by right shifting on 2 bits.

It can be seen that all pixels in the block can be processed independently in case of maximum parallelism is required.

In this embodiments, the threshold THR is set to a predefined value, for example, 128, that in case of straightforward implementation requires to store 128 (1<<7) entries of 7-bit values per each QP.

The size of LUT influences on amount of on-chip memory requirements and the cost of a hardware implementation of the filter. To reduce amount of on-chip storage the LUT is calculated only for a limited set of QPs starting from QP 20 with a constant interval of 8. Totally five pre-defined LUTs (for five QPs group) are stored. For filtering of current block CU's QP is rounded to closest one from the table.

For further reduction of LUT size the N lowest bits are dropped (or ignored) during LUT generation. That allows having sparse table representation.

For exemplary implementation A, N is equal to 2, that leads to 7−2=5 bits of table depth (32 entries of 7-bit values);

For exemplary implementation B, N is equal to 3, that leads to 7−3=4 bits of table depth (16 entries of 7-bit values).

Thus total memory size required for entire LUT storage:

For exemplary implementation A: 5×32×7 bits=1120 bits=140 bytes;

For exemplary implementation B: 5×16×7 bits=560 bits=70 bytes;

Exemplary implementation B is targeting to 16 bytes of LUT size to enable parallel access in software implementation due to ability to store entire LUT in one 16 bytes SSE register therefore this configuration is suggested.

If Hadamard transform is used, and a filtered pixel is placed to its original position according to the predefined scan template, then the following pseudo-code describes filtering process of method 300:

```
// reconstructed/predicted pixels scan
const int x0 = pIn[p0];
const int x1 = pIn[p1];
const int x2 = pIn[p2];
const int x3 = pIn[p3]; // p0-p3 define scan pattern
// 1D forward Hadamard transform
const int y0 = x0 + x2;
const int y1 = x1 + x3;
const int y2 = x0 - x2;
const int y3 = x1 - x3;
const int t0 = y0 + y1;
const int t1 = y0 - y1;
const int t2 = y2 + y3;
const int t3 = y2 - y3;
// frequency domain filtering
const int z0 = pTbl[t0];
const int z1 = pTbl[t1];
const int z2 = pTbl[t2];
const int z3 = pTbl[t3];
// backward Hadamard transform
const int iy0 = z0 + z2;
const int iy1 = z1 + z3;
const int iy2 = z0 - z2;
const int iy3 = z1 - z3;
// output filtered pixel
pOut[p0_out] = iy0 + iy1;
```

If Hadamard transform is used, and more than one filtered pixels from linear buffer of filtered samples are added to accumulation buffer, then the following pseudo-code describes filtering process of this scenario:

```
// reconstructed/predicted pixels scan
const int x0 = pIn[p0];
const int x1 = pIn[p1];
const int x2 = pIn[p2];
const int x3 = pIn[p3]; // p0-p3 define scan pattern
// 1D forward Hadamard transform
const int y0 = x0 + x2;
const int y1 = x1 + x3;
const int y2 = x0 - x2;
const int y3 = x1 - x3;
const int t0 = y0 + y1;
const int t1 = y0 - y1;
const int t2 = y2 + y3;
const int t3 = y2 - y3;
// frequency domain filtering
const int z0 = pTbl[t0];
const int z1 = pTbl[t1];
const int z2 = pTbl[t2];
const int z3 = pTbl[t3];
```

```
// backward Hadamard transform
const int iy0 = z0 + z2;
const int iy1 = z1 + z3;
const int iy2 = z0 - z2;
const int iy3 = z1 - z3;
```

As alternative embodiment the accumulation buffer should be initialized by unfiltered pixel values multiplied by maximum number of pixel values to be added in the block. The maximum number of pixel values to be added in the block is defined based on scan template. Indeed scan template defines a number of pixel values added for each position. Based on that, the maximum number from all positions in the block can be selected and used during accumulation buffer initialization. Then, during each accumulation step, the unfiltered pixel value is subtracted from corresponding filtered value and added to accumulation buffer:

```
// filtered pixels accumulation
pOut[p01 += iy0 + iy1 // p0-p3 define scan pattern
pOut[p1]+= iy0 - iy1
pOut[p2]+= iy2 + iy3
pOut[p3]+= iy2 - iy3
```

For reducing bit depth of accumulated pixel values before placing into accumulation buffer result of backward transform may be normalized on size of transform (m):
pOut[p0]+=((iy0+iy1)>>HTDF_BIT_RND4);
pOut[p1]+=((iy0-iy1)>>HTDF_BIT_RND4);
pOut[p2]+=((iy2+iy3)>>HTDF_BIT_RND4);
pOut[p3]+=((iy2-iy3)>>HTDF_BIT_RND4);
where HTDF_BIT_RND4 is equal to 2 for transform size of 4.

This embodiment allows the system to avoid storing the number of pixels added to current position and allows for replacement division and multiplication by shift operation at the last normalization step and accumulation buffer initialization step correspondingly if the maximum number of pixel values added is a power of e.g., 2, 4, 8 etc.
To keep precision of normalization stage it can be performed in a following way:

```
// normalization
pFiltered[p0] = CLIP3(0, (1 << BIT_DEPTH) - 1, (pOut[p0] + HTDF_CNT_SCALE_RND) >> HTDF_CNT_SCALE);
``` where HTDF_CNT_SCALE is Log2 of amount of pixels placed into accumulating buffer, e.g. for amount of 4 HTDF_CNT_SCALE is equal to 2, and HTDF_CNT_S-CALE_RND is equal to (1<<(HTDF_CNT_SCALE-1)). CLIP3 is a clipping function which ensures filtered sample is in allowed range between minimum and maximum sample value.

As was mentioned above to avoid changing of average luminance of filtered block it may be advantageous to skip filtering of first spectrum component (corresponding to DC value). That further allows to simplify filter implementation. In this case filtering step is as follows:

```
// frequency domain filtering
const int z0 = t0;
```

```
const int z1 = pTbl[t1];
const int z2 = pTbl[t2];
const int z3 = pTbl[t3];
```

For each pixel inside of reconstructed block or predicted block, a scan template is chosen based on position of filtering pixel inside reconstructed block or predicted block for steps 302 and 310. Scan template is chosen to guarantee all pixels be inside reconstructed CU or predicted CU and place close to processing pixel. Arbitrary scan order can be used inside template. For example, the predefined scan template is defined as set of spatial or raster offsets relative to a position of the current pixel inside the reconstructed block or predicted block, where offsets point to neighbor pixels are inside the reconstructed block or predicted block. Below is an example of scan template:
(0,0), (0,1), (1,0), (1,1)

Figure 4A:
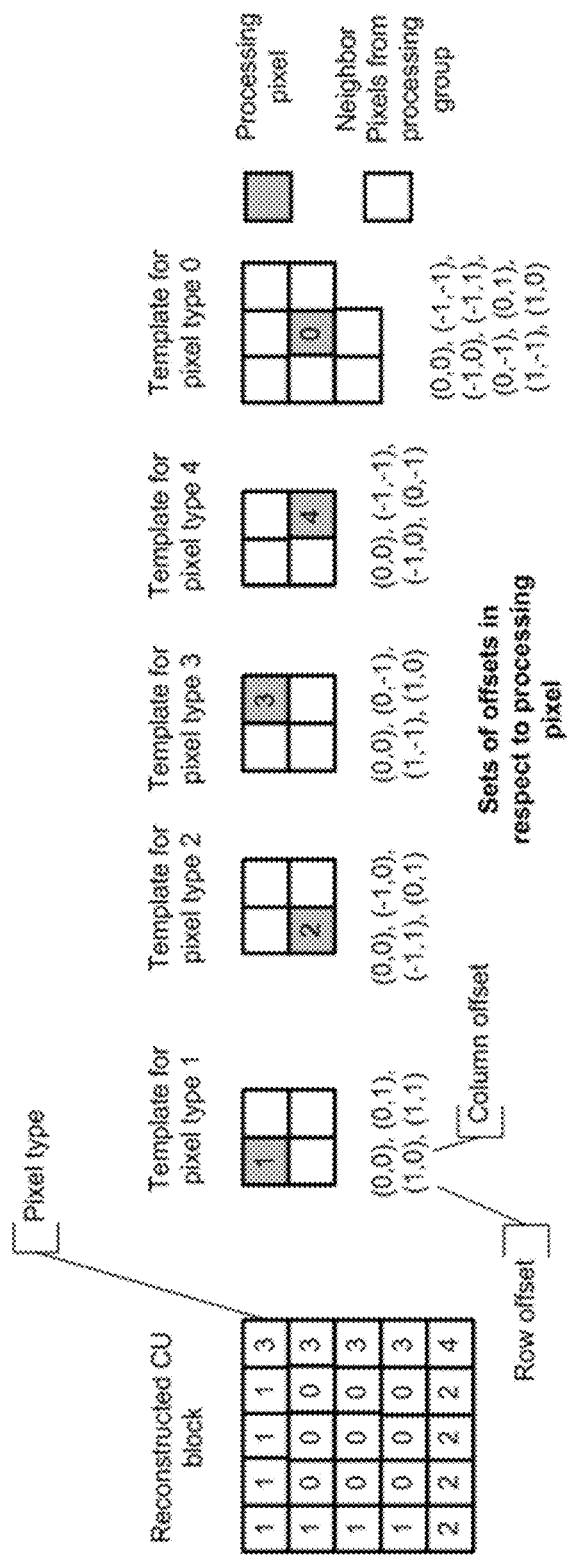
FIG. 4A illustrates templates for different pixel position inside square reconstructed block.

FIG. 4A illustrates an example of templates for different pixel position inside square block (For example, square CU predicted block, or square CU reconstructed block). According to this figure boundary pixels can be filtered based on 4 point transform and central pixels can be filtered based on 8 point transform.

For rectangular reconstructed blocks or predicted blocks, wherein size of one side is more size of other side the scan should be performed along long side. For example for horizontal rectangular block the following scan order can be used
(0,-3), (0,-2), (0,-1), (0,0), (0,1), (0,2), (0,3), (0,4),
where in each pair (y,x) x is horizontal offset and y is vertical offset in respect to position of filtering pixel inside filtering reconstructed block or predicted block.

The proposed filter can be selectively applied depending on conditions:
for reconstructed blocks or predicted blocks with non-zero residual signal;
depending on block size, e.g. for small reconstructed block or predicted block (e.g. if block size evaluated as multiplication of block width on block height is less than threshold);
depending on an aspect ratio of the reconstructed block or predicted block;
depending on prediction mode (Intra or Inter) of the reconstructed block or predicted block, e.g., by applying filter to inter-predicted blocks only; or
for any combination of described above conditions.

For example, to avoid processing of small blocks thy filter can be bypassed (not applied) if block size is less or equal to 4×4 pixels. That reduces worst-case complexity which is usual corresponds to smallest block processing.

As another example filter is applied only to blocks that have non-zero residual signal. That is beneficial if quantization or residuals was used since the filter is aimed to improve quantization error. If block has no residual that maybe an indication that prediction is good and no further filtering is required.

As another example, since intra prediction normally is worse than inter, the filter can be applied to intra predicted blocks independently of presence of non-zero residual and applied to inter predicted blocks only if block has non-zero residual signal.

Filter parameter sigma and scan pattern may vary depending on conditions listed above.

Figure 4B:
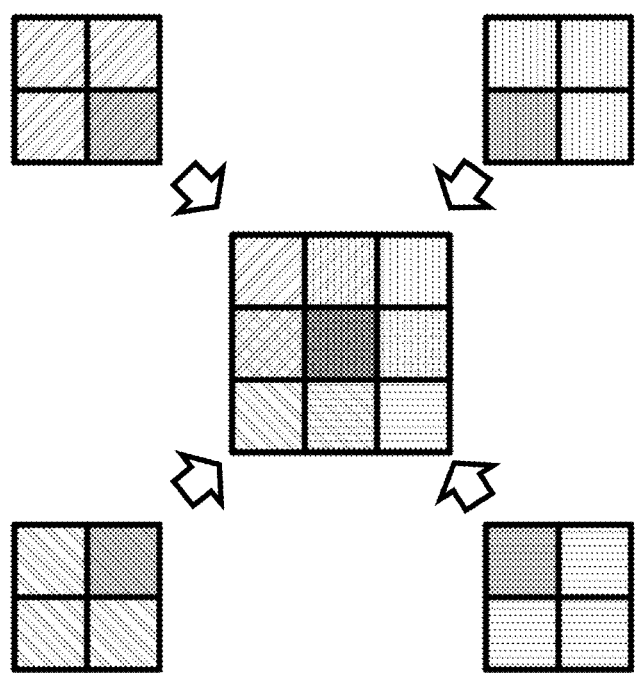
FIG. 4B illustrated equivalent filter shape for one pixel.

FIG. 4B illustrates equivalent filter shape considering one pixel inside of current block for exemplary scan template (0,0), (0,1), (1,0), (1,1). For the filtering of current pixel square area of 3×3 pixels is used (current pixel is marked by dark-gray color in the center of 3×3 square). Filtered pixel is obtained by combining transform domain filtered samples from four 2×2 groups. It can be understood that if current pixel is located in block border (e.g. top border) top left and top right 2×2 groups are unavailable and only two 2×2 groups (bottom left and bottom right) can be used for filtering. Furthermore if current pixel is located in block corner (e.g. top-left corner) only one 2×2 group (bottom right) can be used for filtering.

Figure 4C:
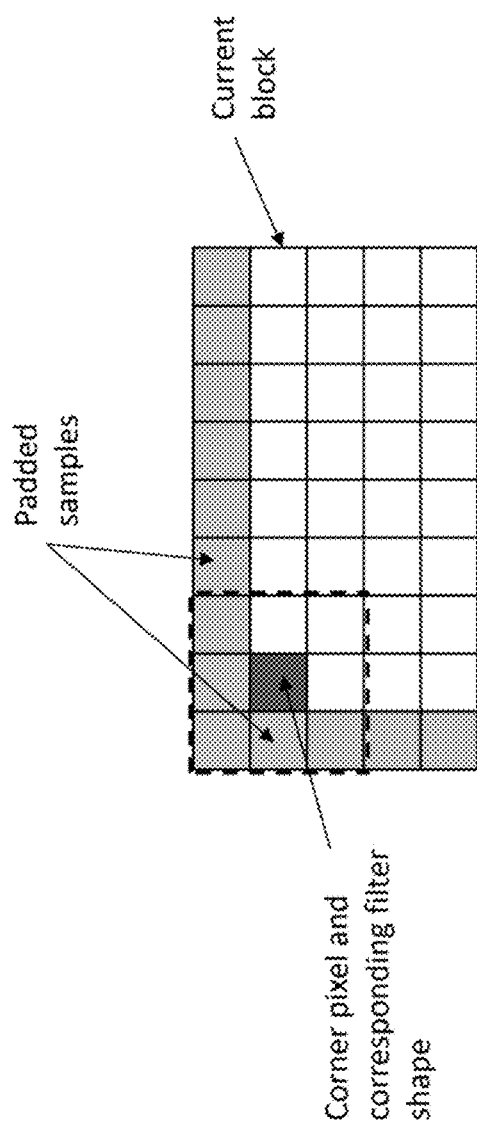
FIG. 4C gives an example of padding.

To increase quality of filtering by using more four 2×2 groups for border and corner pixels, the current block can be padded by additional samples. FIG. 4C gives an example of padding on left and top sides. Padding samples can be taken from already reconstructed blocks.

Figure 4D:
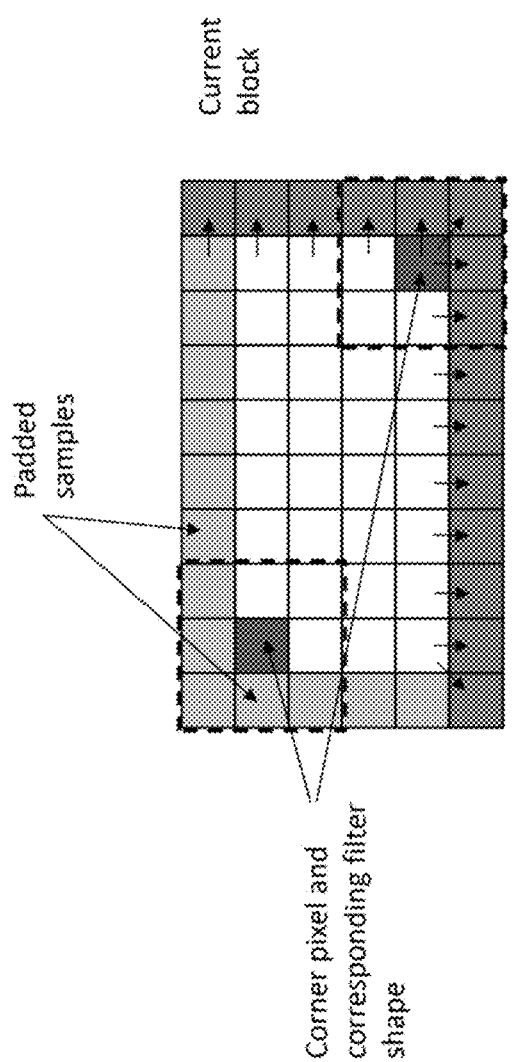
FIG. 4D gives another example of padding.

For further unification of filtering process for all pixels in block (four 2×2 groups are used for filtering of all pixels in current block), in addition to top-left padding current block can also be extended by bottom-right padding as illustrated on FIG. 4D. Unification of filtering is beneficial due to simplifying implementation by excluding special processing cases for corner pixels and/or border pixels.

Padding samples are preferably taken from adjusted neighboring samples from already reconstructed blocks. In state-of-the-art video codecs those already reconstructed blocks can be located either on left or top side from current block or on right or bottom side depending on block reconstruction order. Using more information from adjustment samples, it improves filtering quality and makes transition between blocks more smooth.

Retrieving reconstructed samples from adjusted blocks or previously reconstructed blocks can require additional memory load for hardware or software implementation. To minimize or exclude additional memory, it is beneficial to use samples intended for intra prediction of current block which are commonly taken from one, two or more rows and columns from neighboring blocks adjusted to current block borders. These samples are usually stored in fast memory (also known as "line" buffer) for easy access for intra prediction and called reference samples of intra prediction.

It should be further noted that in some implementation, before performing intra prediction, reference sample (intra reference samples) are pre-processed before prediction e.g. by smoothing, sharpening, de-ringing or bilateral filtering. In this case it may be beneficial to use pre-processed samples for padding of current block.

If some samples in the padded area are not available, due to order of adjusted block reconstruction, required samples can be padded from the current block expanding border pixels to the padded area as illustrated on FIG. 4D.

Figure 5A:
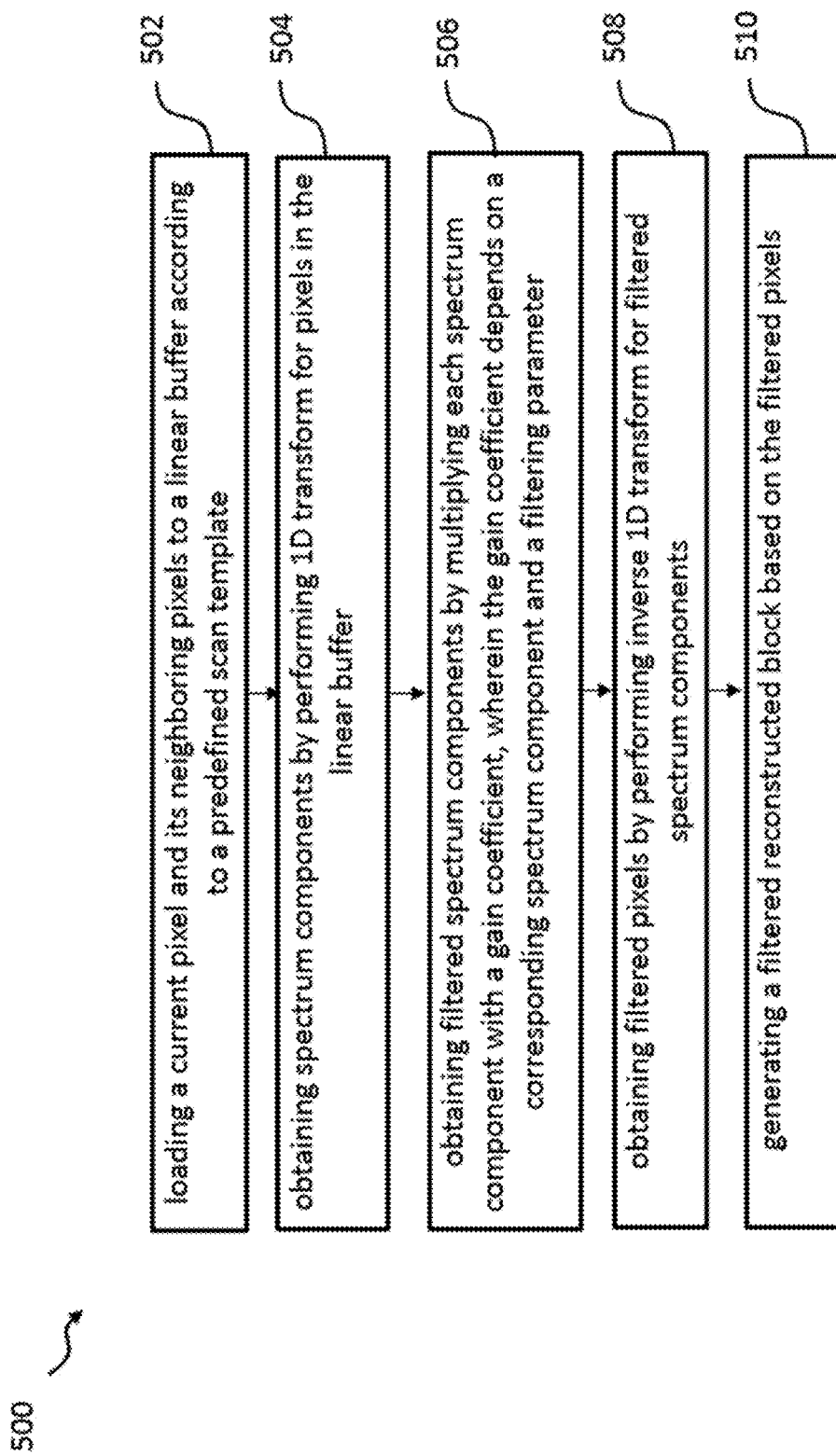
FIG. 5A shows a flow diagram illustrating steps of a filtering method according to an embodiment.

FIG. 5A shows a flow diagram illustrating steps of a corresponding in-loop filtering method 500 according to an embodiment. The reconstructed block comprises a plurality of pixels. The method 500 comprises the following steps: loading (502) a current pixel and its neighboring pixels to a linear buffer according to a predefined scan template; obtaining (504) spectrum components by performing 1D transform for pixels in the linear buffer; obtaining (506) filtered spectrum components by multiplying each spectrum component with a gain coefficient, wherein the gain coefficient depends on a corresponding spectrum component and a filtering parameter; obtaining (508) filtered pixels by performing inverse 1D transform for filtered spectrum components; and generating (510) a filtered reconstructed block based on the filtered pixels estimated on previous processing steps. Method 500 can be performed by the encoding apparatus as shown in FIG. 1 and the decoding apparatus as shown in FIG. 2. Detailed information 300 of FIG. 3A or information 300' of FIG. 3B are also applied to method 500 as shown in FIG. 5A.

Figure 5B:
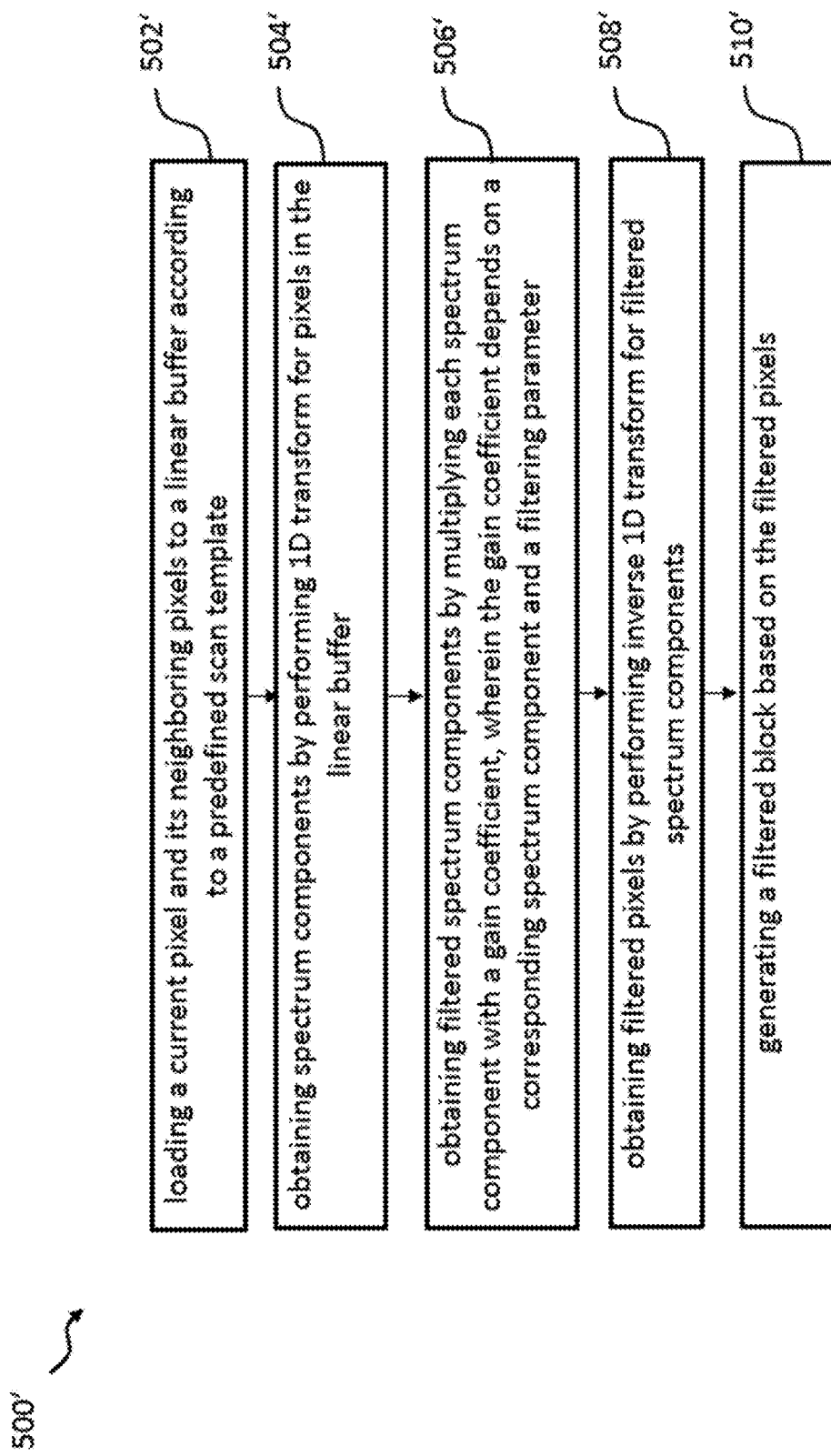
FIG. 5B shows a flow diagram illustrating steps of a filtering method according to an embodiment.

Similar to FIG. 5A, FIG. 5B shows a flow diagram illustrating steps of a corresponding in-loop filtering method 500' according to another embodiment. At this example, the block (or frame) is a predicted block, and the filtered block is a filtered predicted block. Detailed description of FIG. 5B is similar to FIG. 5A.

The hardware implementation is discussed.

Hadamard transform domain filter is placed just after block reconstruction and process samples that can be involved into subsequent blocks reconstruction particularly as a reference samples of intra prediction. Thus the latency introduced by the filter needs to be minimize to ensure entire reconstruction pipeline is not affected much.

Hadamard transform is considered to be relatively simple for hardware implementation. Only additions are required for its implementation but multiplications. As can be seen from below Pseudo code 1, forward and backward transform contains 4 addition which can be done in parallel or by reusing of intermediate results with two sequential addition operations.

Pseudo code 1

```
for (int r = 0; r < height - 1; ++r)
{
  Pel *pIn = &block[r*strideBlk];
  Pel *pAcc = &accBlock[r*strideAcc];
  for (int < = 0; c < width - 1; ++c, pIn++, pOut++)
  {
    const int x0 = pIn[p0];
    const int x1 = pIn[p1];
    const int x2 = pIn[p2];
    const int x3 = pIn[p3];
    // forward transform
    const int y0 = x0 + x2;
    const int y1 = x1 + x3;
    const int y2 = x0 - x2;
    const int y3 = x1 - x3;
    const int 0 = y0 + y1;
    const int t1 = y0 - y1;
    const int t2 = y2 + y3;
    const int t3 = y2 - y3;
    // filtering
    const int z0 = 0; // skip DC
    const int z1 = RdTbl(t1, tb1, thr);
    const int z2 = RdTbl(t2, tb1, thr);
    const int z3 = RdTbl(t3, tb1, thr);
    // backward transform
    const int iy0 = z0 + z2;
    const int iy1 = z1 + z3;
    const int iy2 = z0 - z2;
    const int iy3 = z1 - z3;
    pAcc [p0_out] += ((iy0 + iy1) >> HTDF_BIT_AND4):
    pAcc [p1_out] += ((iy0 - iy1) >> HTDF_BIT_AND4):
    pAcc [p2_out] += ((iy2 + iy3) >> HTDF_BIT_AND4):
    pAcc [p3_out] += ((iy2 - iy3) >> HTDF_BIT_AND4):
    // normalization
    pIn[p0] = ClipPel((pOut[p0_out] +
    HTDF_CNT_SCALE_RND) >> HTDF_CNT_SCALE, clpRng):
  }
}
```

Forward and backward Hadamard transform can be implemented in hardware by using combinational logic. The more attention is required to fast and parallel access to the LUT.

The SRAM based LUT is discussed.

Figure 6:
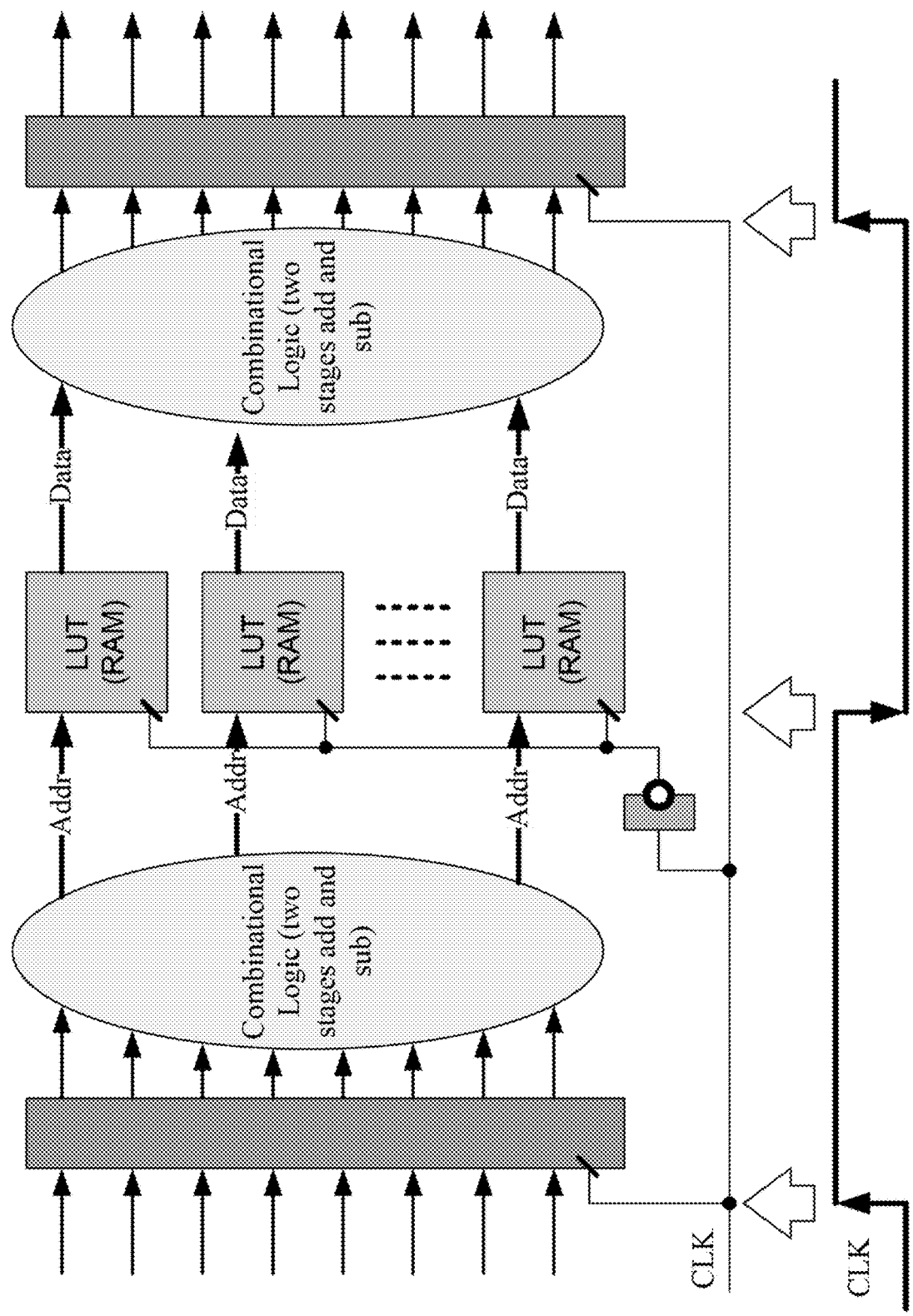
FIG. 6 is an example hardware filter design based on SRAM.

In this example implementation, the LUT is stored in on-chip single port Static RAM (FIG. 6).

Once data prom previous processing step are available in the buffer by rising edge of the clock it is accessed by combinational logic implementing forward Hadamard transform (containing two subsequential additions). After completing the combinational logic address is available for each LUT. Using invertor and falling edge of the clock the data is accessed from the SRAM. Second combinational logic implementing backward Hadamard transform and normalization is started immediately after data from LUT is available. The output filtered samples became available at the end of current clock cycle and are ready for processing by next algorithm at the next rising edge of the clock.

The flip-flop based LUT is discussed.

Figure 7:
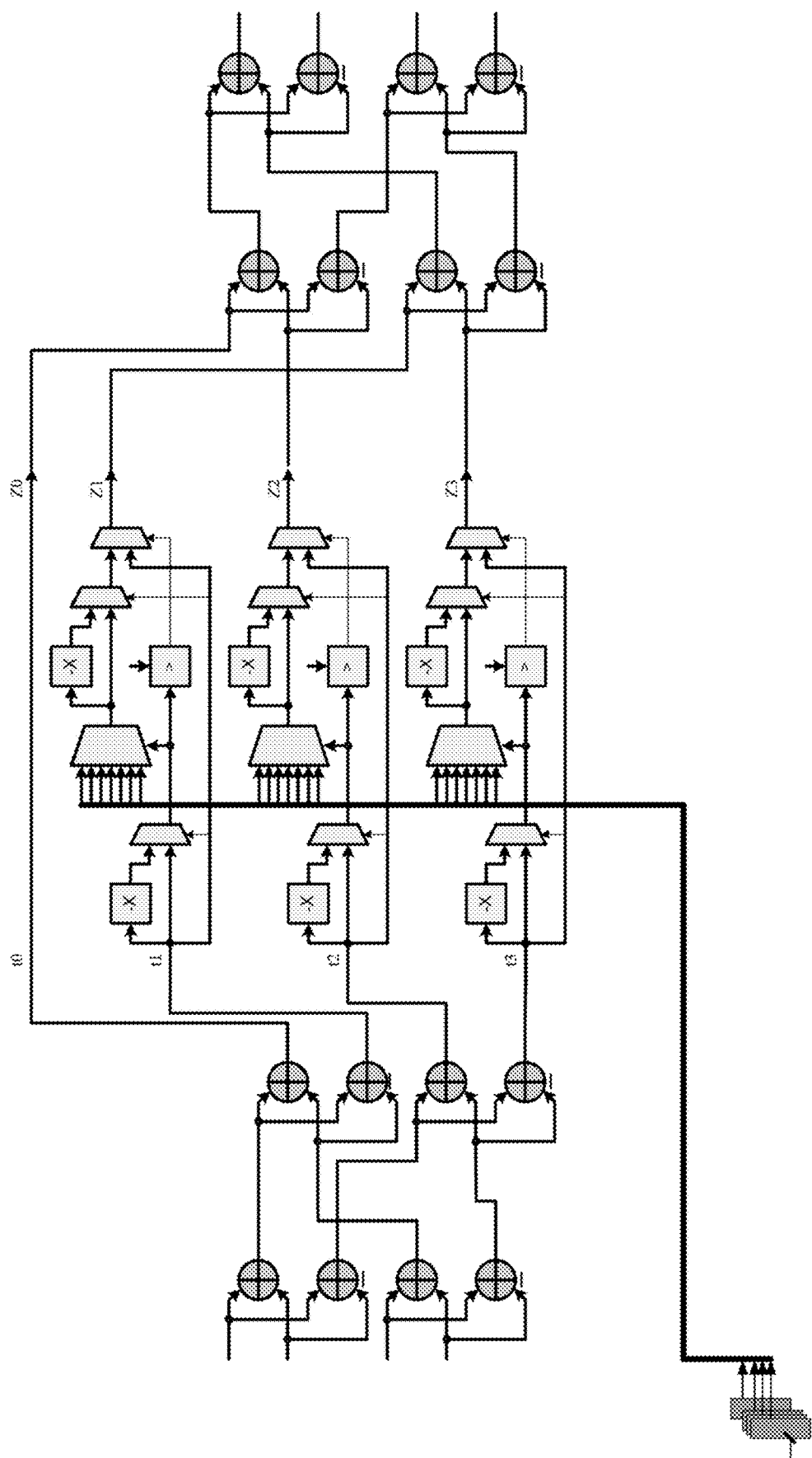
FIG. 7 is exemplary hardware design of 2×2 group filtering based on flip-flops.

Considering that one table for filtering process is limited by 16 entries it looks more efficient to implement LUT based on flip-flops. Such design does not require several LUTs for parallel processing and clock edge for data access. Parallel access is provided by multiplexer as depicted in FIG. 7 illustrating exemplary design for processing one 2×2 group. In suggested design 16 flip-flops of 7 bits are required to provide parallel access during the filtering process. The QP specific LUT can be loaded to flip-plops once QP for current CU is available.

Figure 8:
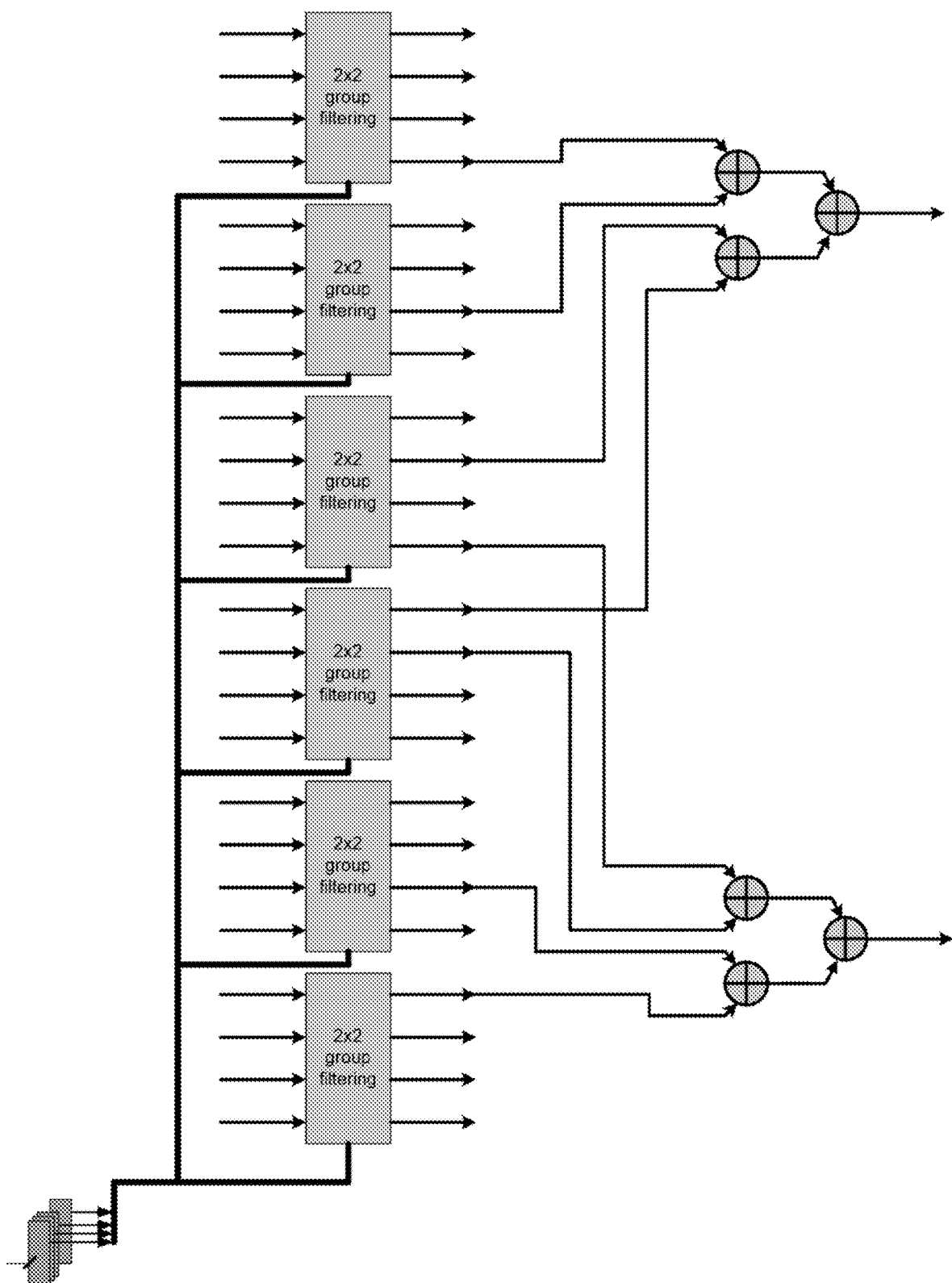
FIG. 8 shows an example of combining results of four 2×2 groups filtering with reusing of results of same spatial group final filter.

Combining results of four 2×2 groups filtering with reusing of results of same spatial group final filter output is generated as depicted on FIG. 8.

Given above analysis allows came to the conclusion that proposed filter can be implemented in hardware within one clock using either SRAM or flip-flop based LUT implementation.

A complexity analysis is discussed.

Measure impact on Bitrate/PSNR relative to the anchor(s).

Complexity analysis (e.g., encoding and decoding time measure, complexity analysis by filling the table below).

Table 1. CE14-3 Complexity Analysis Summary

Experimental results are discussed.
Objective results are discussed.
The objective performance is presented in the following tables:

TABLE 2

| Coding performance of test 14-3a | | | | | |
|---|---|---|---|---|---|
| | Over BMS-2.0.1 with VTM config | | | | |
| | Y | U | V | EncT | DecT |
| All Intra Main10 | | | | | |
| Class A1 | −0.19% | 0.29% | 0.24% | 110% | 115% |
| Class A2 | −0.35% | 0.31% | 0.32% | 109% | 112% |
| Class B | −0.42% | 0.29% | 0.32% | 109% | 113% |
| Class C | −0.83% | 0.23% | 0.42% | 110% | 110% |
| Class E | −0.54% | 0.28% | 0.19% | 109% | 114% |
| Overall | −0.48% | 0.28% | 0.31% | 109% | 112% |
| Class D | −0.61% | 0.47% | 0.01% | 109% | 108% |
| Class F (optional) | −0.82% | 0.07% | 0.04% | 108% | 107% |
| Random Access Main 10 | | | | | |
| Class A1 | −0.43% | −0.23% | −0.25% | 105% | 104% |
| Class A2 | −0.92% | −0.57% | −0.43% | 105% | 103% |
| Class B | −0.69% | −0.02% | −0.27% | 106% | 104% |
| Class C | −0.75% | 0.10% | 0.14% | 105% | 104% |
| Class E | | | | | |
| Overall | −0.70% | −0.14% | −0.19% | 105% | 104% |
| Class D | −0.67% | −0.14% | 0.53% | 104% | 103% |
| Class F (optional) | −0.77% | 0.10% | 0.13% | 104% | 102% |
| Low delay B Main10 | | | | | |
| Class A1 | | | | | |
| Class A2 | | | | | |
| Class B | −0.58% | 0.52% | 0.54% | 104% | 104% |
| Class C | −0.74% | 0.33% | 0.52% | 104% | 104% |
| Class E | −0.75% | 0.31% | 1.09% | 102% | 101% |
| Overall | −0.68% | 0.40% | 0.67% | 104% | 103% |
| Class D | −0.90% | 0.75% | 0.28% | 104% | 104% |
| Class F (optional) | −0.73% | 0.20% | −0.09% | 103% | 102% |

TABLE 1

| CE14-3 complexity analysis summary | | | | | | | |
|---|---|---|---|---|---|---|---|
| Test # | filter shape | Computational complexity (# of multiplications/ additions/shifts/ checks*) per sample | Precision of multiply | Parallel friendly (each sample can be filtered independently from other samples) | Number of clock cycles | memory requirement | How to derive filter coeffs | Minimal CU Size for applying filters |
| 14.3 a | 3x3 | 0/20 + 41-bit add for round/5/6 | n/a | yes | <1 clock | 140 bytes (32 7-bit values per qp group) | Precalculated in LUT | 4x8, 8x4 |
| 14.3 b | 3x3 | 0/20 + 41-bit add for round /5/6 | n/a | yes | <1 clock | 70 bytes (16 7-bit values per qp group) | Precalculated in LUT | 4x8, 8x4 |

*max/min/abs are countered as checks

TABLE 3

Coding performance of test 14-3b

Over BMS-2.0.1 with VTM config

| | Y | U | V | EncT | DecT |
|---|---|---|---|---|---|
| All Intra Main10 | | | | | |
| Class A1 | −0.17% | 0.28% | 0.28% | 110% | 115% |
| Class A2 | −0.33% | 0.27% | 0.29% | 109% | 112% |
| Class B | −0.40% | 0.31% | 0.39% | 109% | 113% |
| Class C | −0.82% | 0.20% | 0.32% | 109% | 110% |
| Class E | −0.54% | 0.34% | 0.25% | 109% | 113% |
| Overall | −0.47% | 0.28% | 0.32% | 109% | 112% |
| Class D | −0.65% | 0.43% | 0.22% | 109% | 108% |
| Class F (optional) | −0.81% | 0.01% | 0.12% | 108% | 107% |
| Random Access Main 10 | | | | | |
| Class A1 | −0.41% | −0.36% | −0.24% | 105% | 105% |
| Class A2 | −0.92% | −0.49% | −0.37% | 105% | 103% |
| Class B | −0.69% | −0.12% | 0.12% | 106% | 104% |
| Class C | −0.75% | 0.14% | 0.10% | 105% | 104% |
| Class E | | | | | |
| Overall | −0.70% | −0.17% | −0.06% | 105% | 104% |
| Class D | −0.69% | −0.30% | 0.49% | 104% | 103% |
| Class F (optional) | −0.82% | 0.11% | 0.11% | 104% | 102% |
| Low delay B Main10 | | | | | |
| Class A1 | | | | | |
| Class A2 | | | | | |
| Class B | −0.57% | 0.49% | 0.69% | 104% | 104% |
| Class C | −0.76% | 0.31% | 0.42% | 104% | 106% |
| Class E | −0.67% | −0.66% | −0.48% | 102% | 102% |
| Overall | −0.66% | 0.14% | 0.31% | 103% | 104% |
| Class D | −0.88% | 0.92% | 0.31% | 103% | 105% |
| Class F (optional) | −0.74% | 0.38% | −0.15% | 103% | 102% |

Suggested LUT 70 bytes with 16 bytes per QP, allowing 1 clock HW implementation. Etc. Proposed to adopt Hadamard transform domain filter to next version of VTM.

The following references are incorporated herein by reference as if reproduced in their entirety:

Joint Video Experts Team (JVET) document JVET-K0068.

The below illustrate examples for optimizing the LUT.

As one example 1, a set of quantization parameters (QPs) are chosen to generate the lookup table (LUT), where the set of QPs include a first QP corresponding to (i) index and a second QP corresponding to (i+1) index, and the first QP and the second QP have a constant interval. For example, the interval may equal to 8, 10 or 16.

For example, taking the constant interval is 8 as an example, sparse table by having LUT for qp={20, 28, 36, 44, 52}. The interval between the first gp 20 and the second gp 28 is 8. Similarly, the interval between the second gp 28 and the third gp 36 is 8. During filtering table with closest QP is chosen.

As another example, taking the constant interval is 8 as an example, sparse table by having LUT for qp={18, 26, 34, 42, 50}. The interval between the first gp 18 and the second gp 26 is 8. Similarly, the interval between the second gp 26 and the third gp 34 is 8. During filtering table with closest QP is chosen.

LUT size: 5×128=640 bytes

Below is pseudo code 2 reflecting which QPs are chosen to generate lookup tables (LUT).

pseudo code 2

```
#define HTDF_MIN_QP                      20
#define HTDF_MAX_QP                      (MAX_QP+1)
#define HTDF_QP_ROUND                    8
  for (int qp_in = HTDF_MIN_QP; qp_in < HTDF_MAX_QP; qp_in++)
    {
      int idx + ( (qp_in − HTDF_MIN_QP) + (HTDF_QP_ROUND>>1) ) / HTDF_QP_ROUND;
      int qp = idx*HTDF_QP_ROUND + HTDF_MIN_QP;
      if (idxPrev != idx)
      {
        tblGen(HTDFTable[idx], qp);
        idxPrev = idx;
      }
    }
```

At the pseudo code, HTDF_QP_ROUND represents the constant interval. Having the interval as power of two is advantageous allowing to implement division operation for index calculation as a shift. It should be noted that different values of constant interval may be chosen e.g. 2, 4, 10, 15 or 16 etc. Moreover as alternative embodiment an interval may be arbitrary and which LUT is calculated for arbitrary set of QPs.

During filtering process index corresponding LUT for given QP is calculated as:

int idx=((qp−HTDF_MIN_QP)+
(HTDF_QP_ROUND>>1))/
HTDF_QP_ROUND;

or alternatively with less precision:

int idx=(qp−HTDF_MIN_QP)/HTDF_QP_ROUND;

If constant interval is power of 2, e.g. then index of LUT can be advantageously calculated using shift operation instead division:

int idx=(qp−HTDF_MIN_QP)>>HTDF_QP_ROUND_LOG2=(qp−HTDF_MIN_QP)>>3;

As another example 2, decoder or encoder drops N bits from table values, and N is an integer. That allows have sparse LUT representation storing only selected values from given range. For example, N is 3. Max table value is 127 (7 bits), dropping 3 bits, the result is 4 bits, that is 16 entries of 7 bit values—16 bytes roughly.

Below is pseudo code 3 describing how LUT is generated according to given qp value.

--- pseudo code 3

```
#define HTDF_TBL_SH        3
#define HTDF_TBL_RND       ((1<<HTDF_TBL_SH)
                           >>1)
void HTDFilter::tblGen(HTDF_TBL_TYPE *tbl, int qp)
{
  float sigma = (2.64f)*powf(2®f, (®.1269f)*(qp − 11));
  int sigma_1 = (int)(sigma * HTDF_SIGMA_SCALE );
  sigma_1 *= sigma_1;
  sigma_1 *= 4;
  for (int k_in = ®; k_in < HTDF_SHORT_TBL_THR; k_in++)
  {
    const int Idx = (k_in + HDTF_TBL_RND)>>HTDF_TBL_SH;
    const int k = Idx << HTDF_TBL_SH;
    unsigned int num = (k*k*k) << 1®;
    int den = ((k*k) << 1®) + sigma_1;
    int value_long = num / den;
    HTDF_TBL_TYPE value_int = (HTDF_TBL_TYPE)value_long;
    tbl[Idx] = value_int;
  }
}
```

---

In given example HTDF_TBL_SH defines number of bits to drop which may be 1, 2, 3, 4 etc. Below is pseudo code illustrating access to sparse LUT during filtration:

tbl[(z+HTDF_TBL_RND)>>HTDF_TBL_SH]

Figure 9:
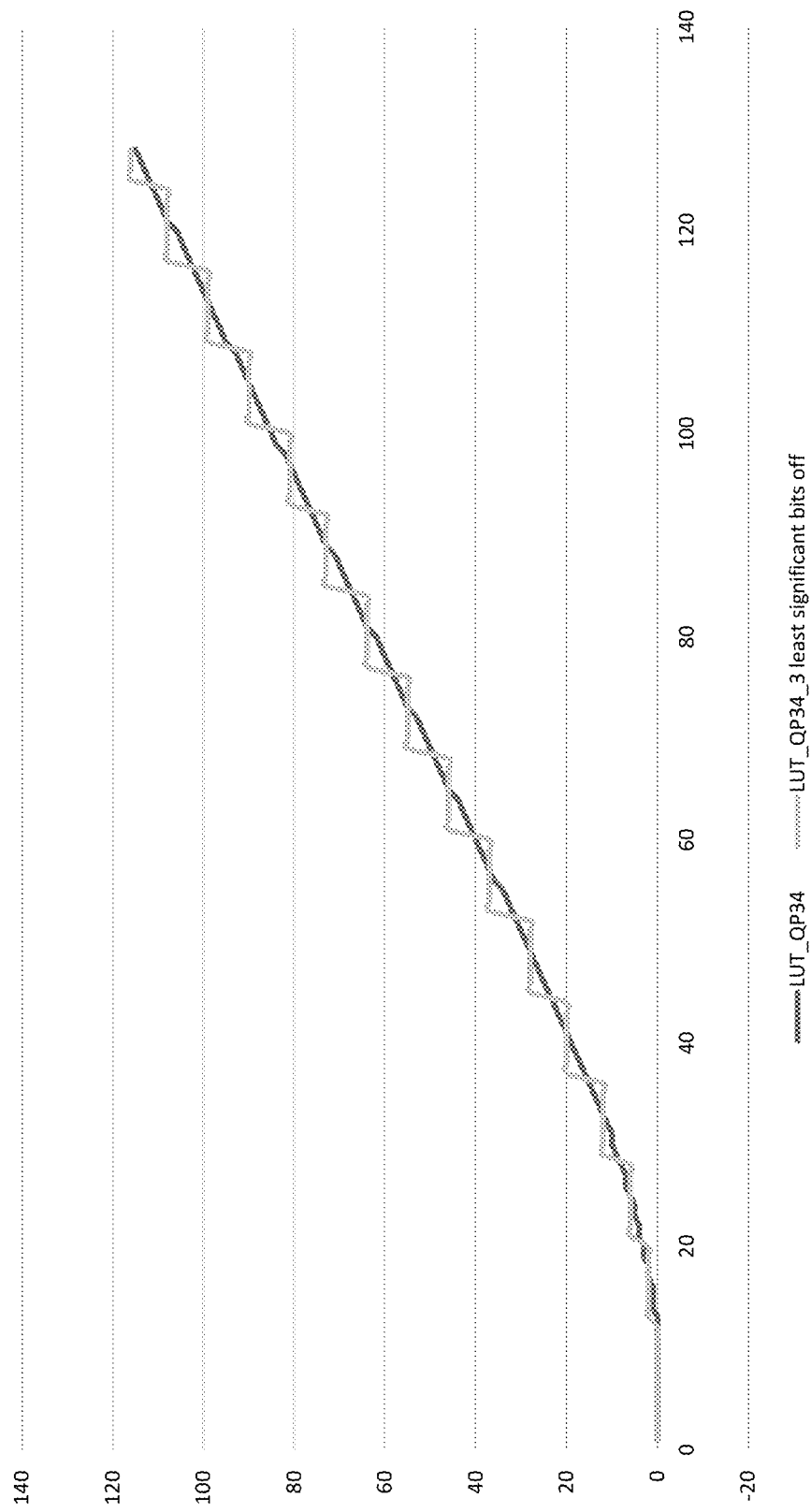
FIG. 9 as an example, shows the result of optimizing the LUT.

When combine the above examples 1 and 2, FIG. 9 as an example, shows the result of optimizing the LUT. As shown in FIG. 9, combining examples 1 and 2: 5 tables×16 entries×7 bits=560 bits=70 bytes.

It should be noted that amount of LUT entries is defined by HTDF_SHORT_TBL_THR (threshold value from equation (5)) and HTDF_TBL_SH number of bits dropped. Considering threshold equal to 128 (that is 1<<7) and bits dropped 3 gives number of tables entries equal to 1<<(7−3)=1<<4=16. As describe above the LUT threshold is preferably chosen to make result of equation (6) close to 1 and as it also described there the threshold may differ depending on QP. Thus for LUT generation for higher QP values it may be beneficial to increase threshold from 128 (1<<7) to e.g. 256 (1<<8). In that case keeping same precision of LUT entries (e.g. with dropped 3 bits) will require 32 entries (32=1<<(8−3)=1<<5). Alternatively to keep same LUT size for higher QPs as for lower QPs the precision may be further reduced to 4 to keep 16 entries of table 16=1<<(8−4)=1<<4.

Figure 10:
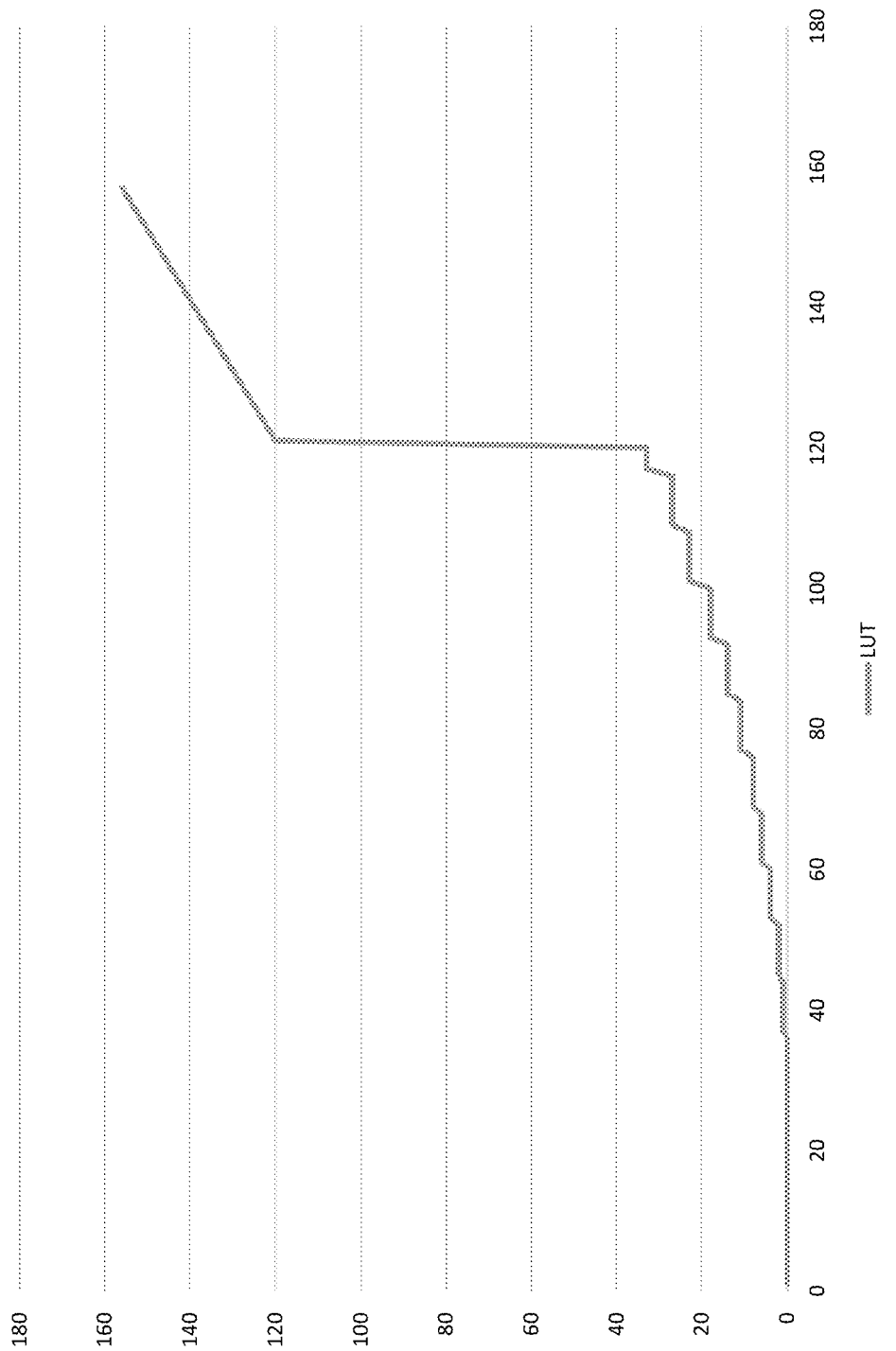
FIG. 10 as an example, shows undesirable gap in filter transfer function.

In some implementation keeping LUT size limited and having THR in order to keep of equation (6) maybe contradictory. Indeed at high QP values (which leads to high σ value) keeping LUT size limited by e.g. 16 entries may lead to undesirable gap in filter transfer function (which is represented by LUT) around value 120 as depicted on FIG. 10 (which also includes method of LUT subsampling by dropping of 3 least significant bits off).

Figure 11:
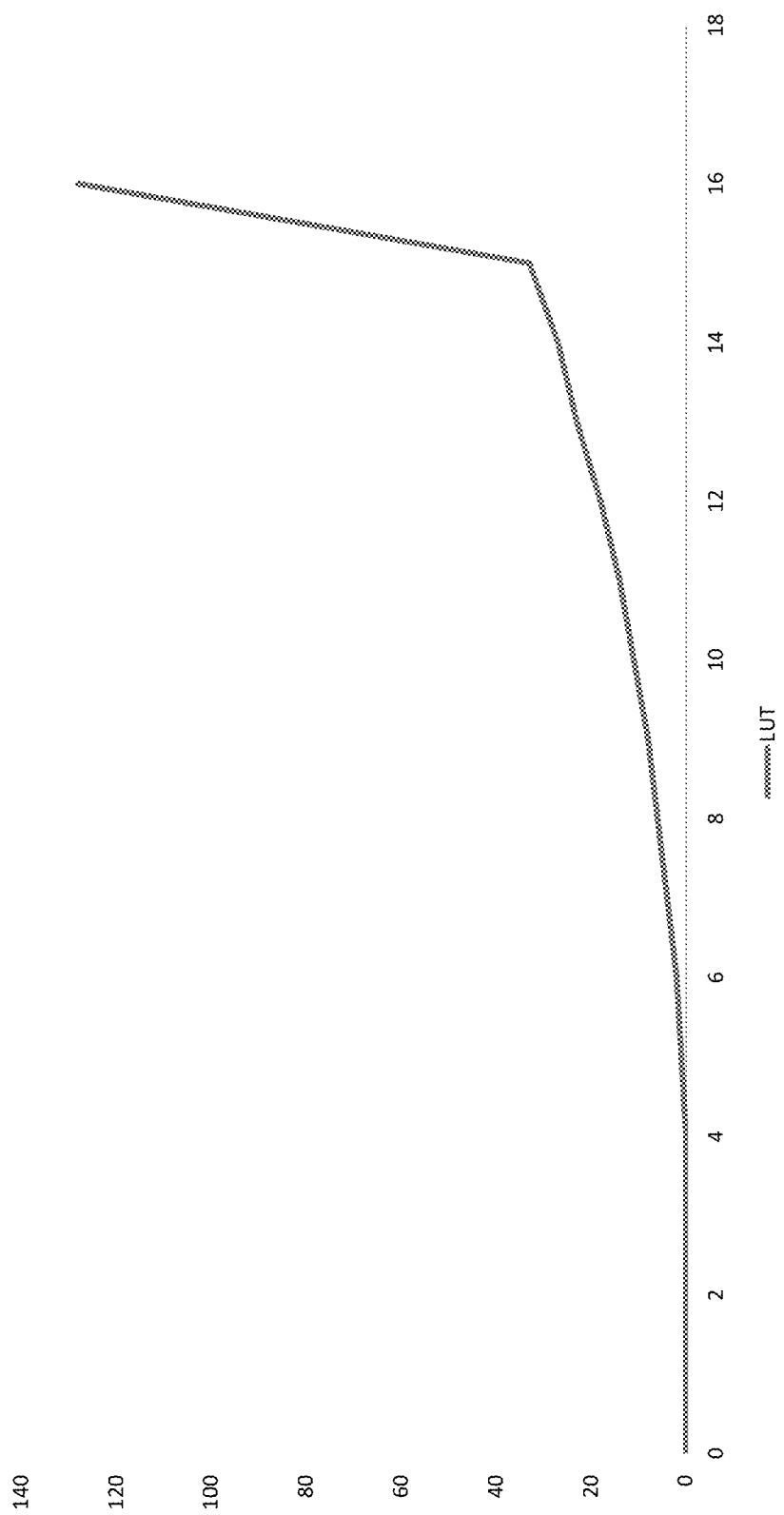
FIG. 11 as an example, represents same table with table entries being plot one-by-one.

FIG. 11 represents same table with table entries being plot one-by-one without consideration LUT subsampling effect illustrating gap between last LUT entry at index 15 and next point in filter transfer function at index 16.

Figure 12:
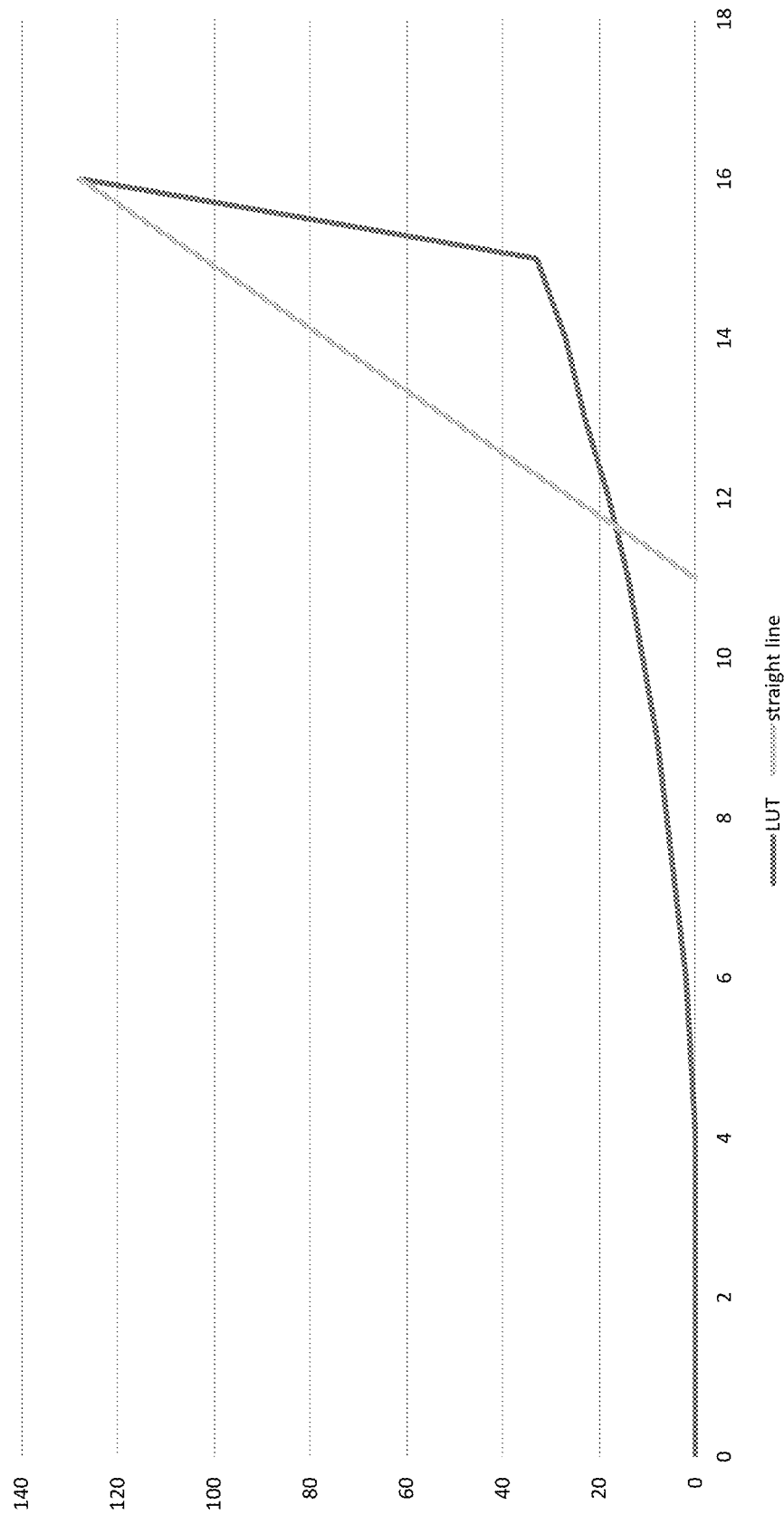
FIG. 12 as an example, illustrates the method how gap can be eliminated using auxiliary function.

FIG. 12 illustrates the method how gap can be eliminated using auxiliary function coming through THR value at the argument of corresponding to last LUT entry+1, e.g. by using straight line equation (pointed by green color), coming through point THR=128 at argument 16 that corresponds to argument of last LUT entry (which is 15) increased by 1 or in other words LUT size (which is 16) and crossing x-axis at some point (e.g. at a value of 11 like in given example). It should be noted that other types of auxiliary functions can be used based on same principle, e.g. exponential, logarithmic, parabolic etc. or combination of them.

Figure 13:
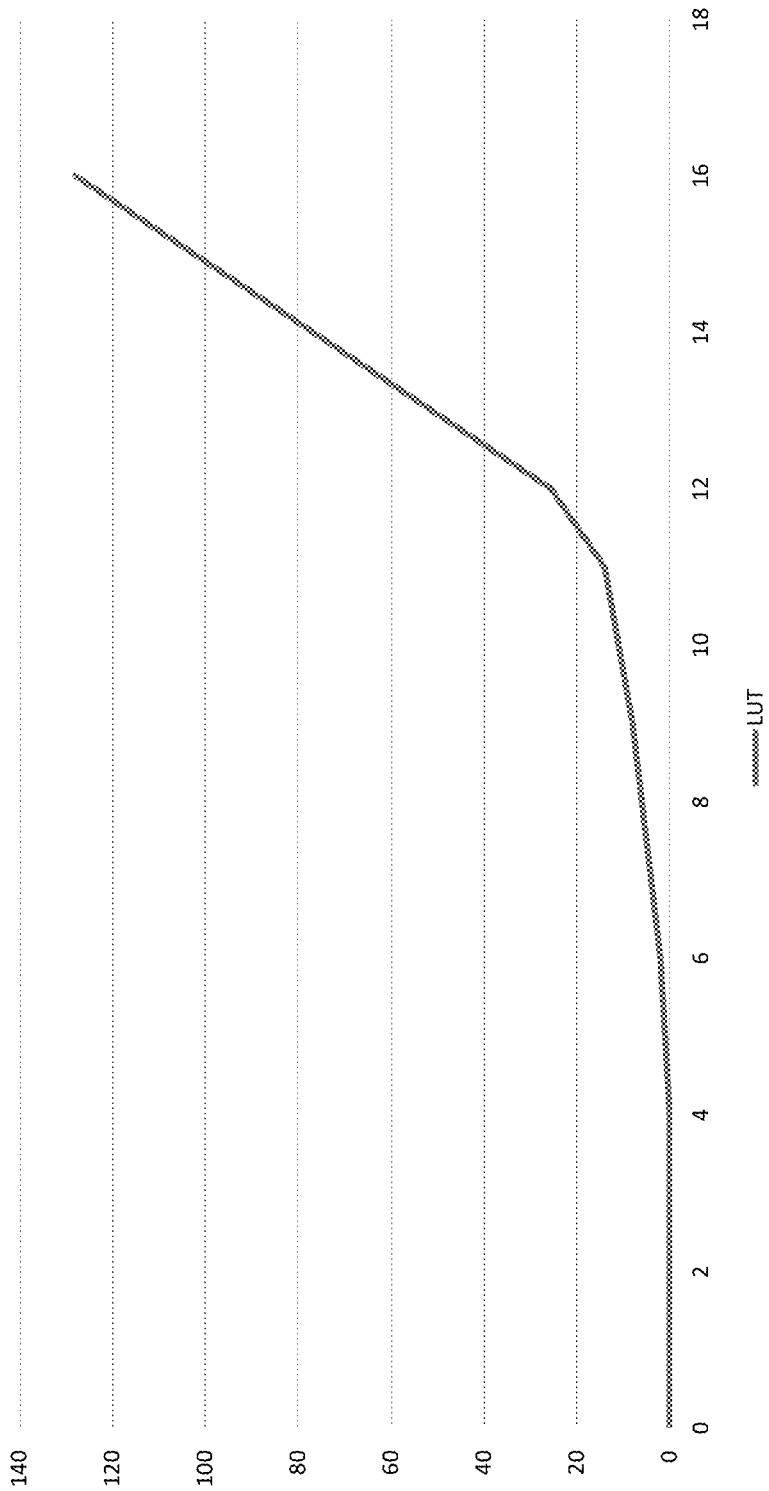
FIG. 13 illustrates the example of eliminating gap by taken maximum from two values while generating the LUT.

FIG. 13 illustrates the example of eliminating gap by taken maximum from two values while generating the LUT, where the first value is LUT entry as described above $$LUT(R_i, \sigma) = \frac{R_i^3}{R_i^2 + m*\sigma^2};$$

and the second is a value of AuxiliaryFunction (straight line in this example) at the same argument $R_i$ $$LUT(R_i, \sigma) = \max\left(\frac{R_i^3}{R_i^2 + m*\sigma^2}, AuxiliaryFunc_\sigma(i)\right);$$

where $AuxiliaryFunc_\sigma(R_i)$ represents the auxiliary function, and the auxiliary function has a value equal to THR at the argument to last LUT entry increased by one.

Figure 14:
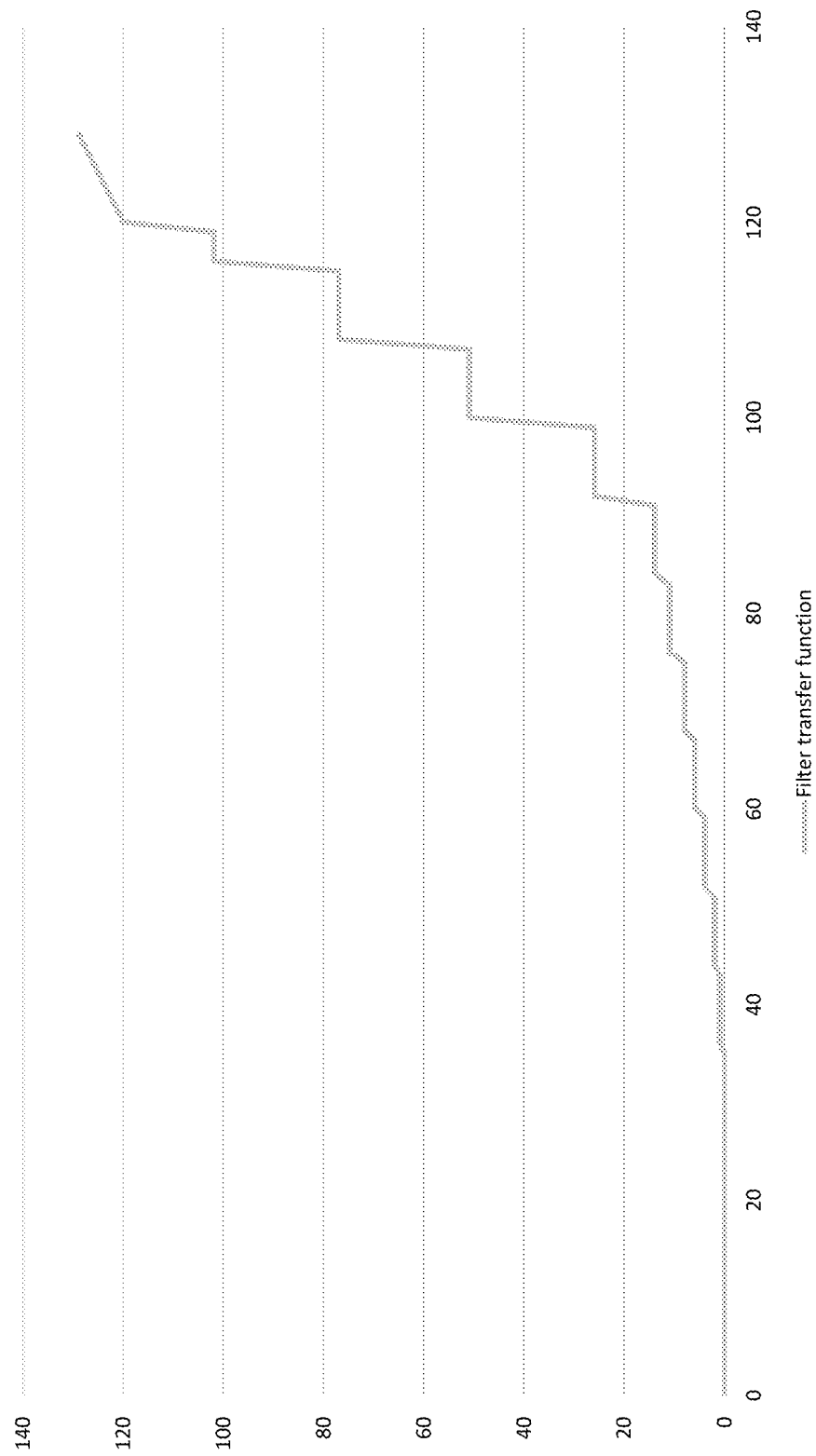
FIG. 14, as an example, illustrates filter transfer function after applying described above method.

FIG. 14 illustrates filter transfer function after applying described above method of using auxilary straight line equation and LUT subsampling by dropping 3 least significant bits.

Figure 15:
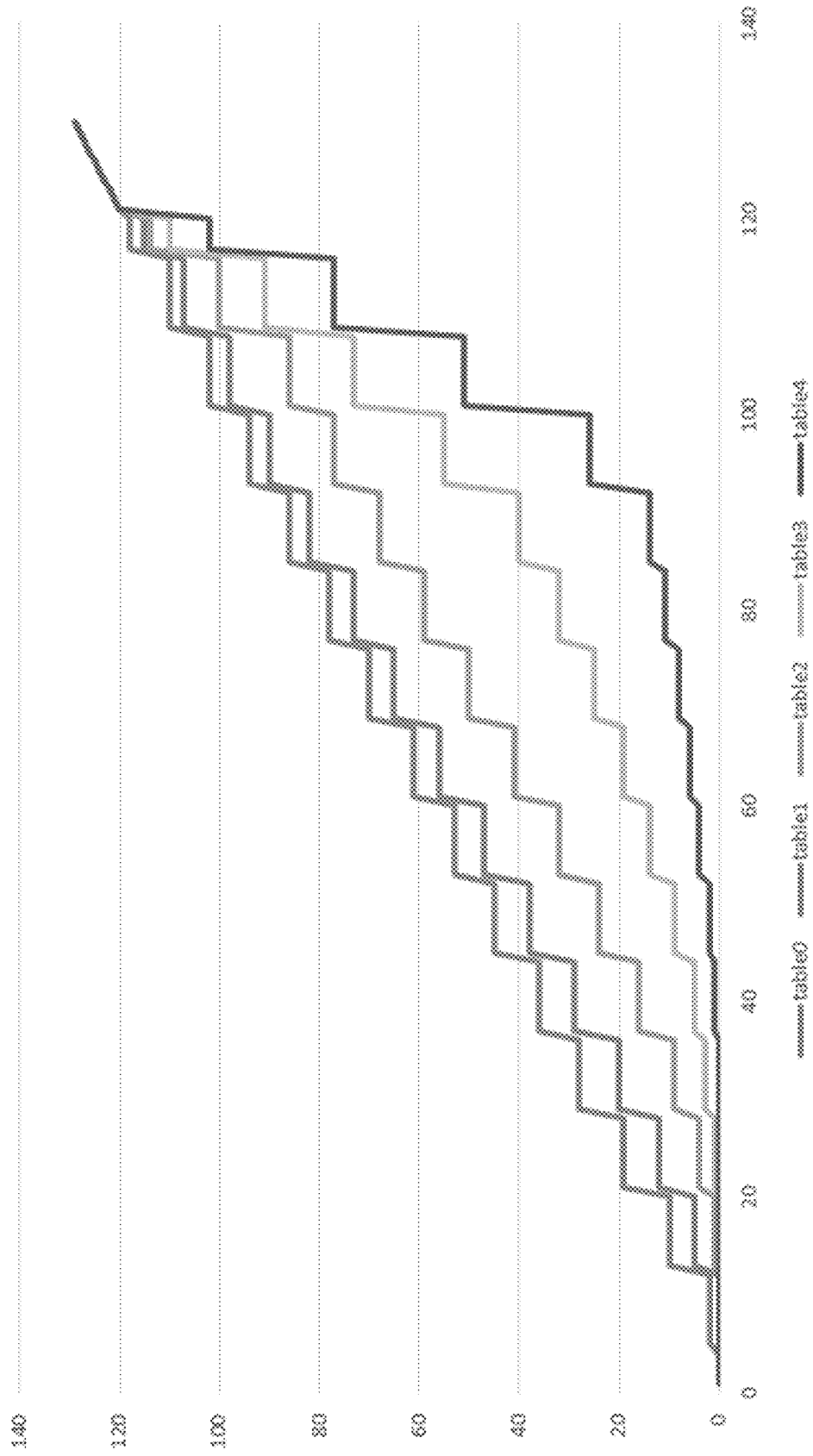
FIG. 15 illustrates example of filter transfer functions depending on five QPs in the set.
Figure 16:
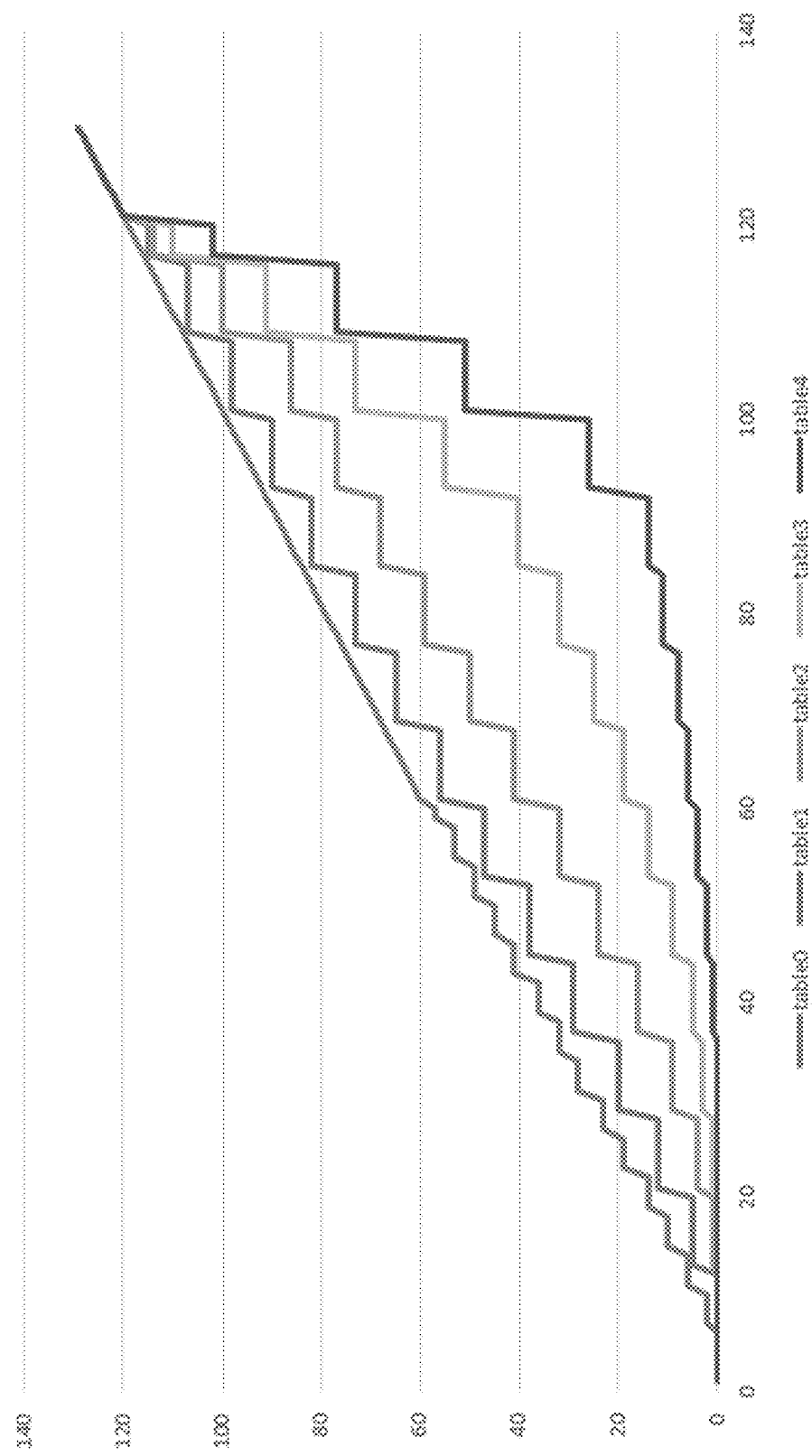
FIG. 16 illustrates example of filter transfer functions for five QPs in the set based on corresponding tables.
Figure 17:
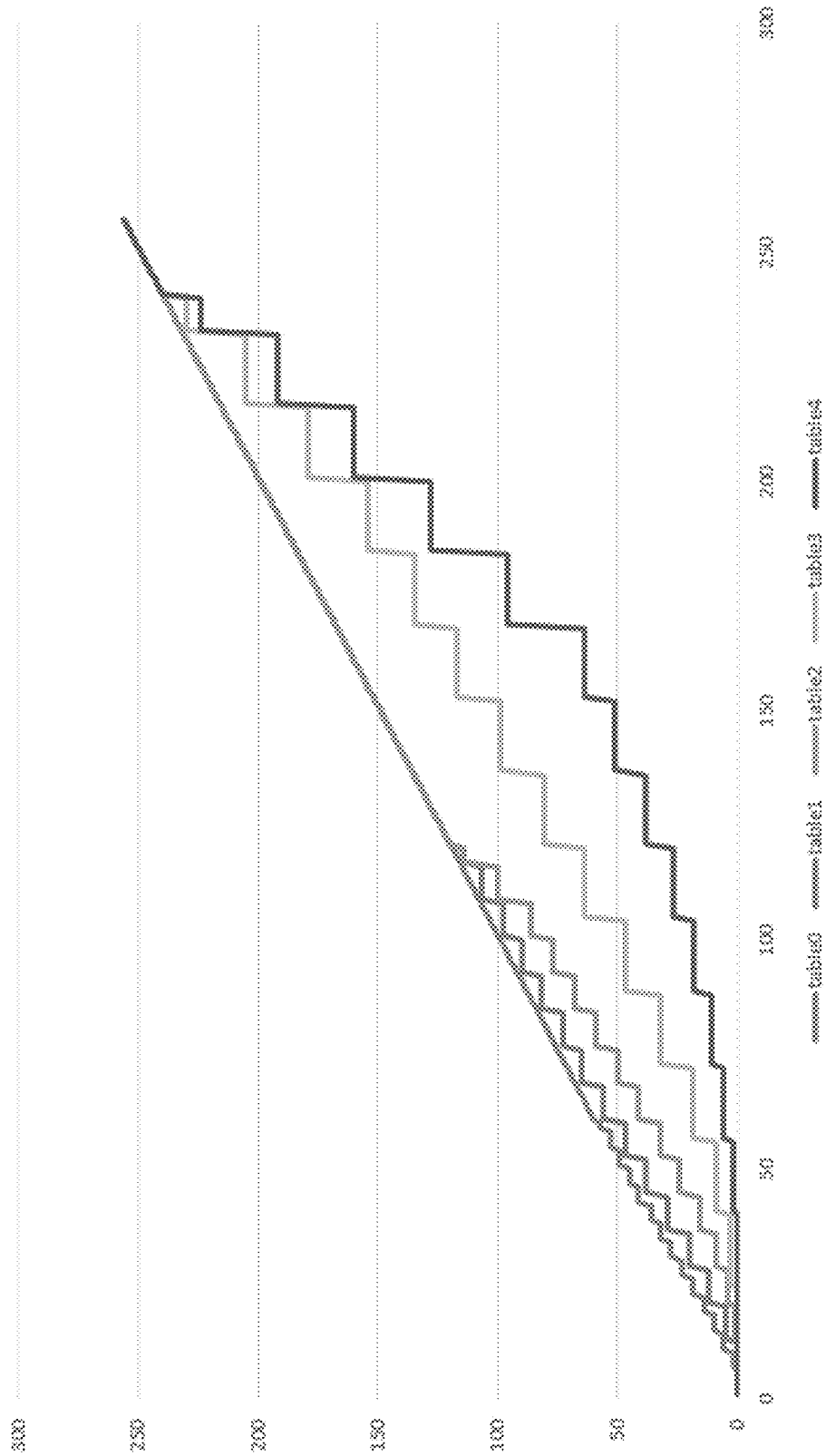
FIG. 17 illustrates example of filter transfer functions for five QPs in the set based on corresponding tables.
Figure 18:
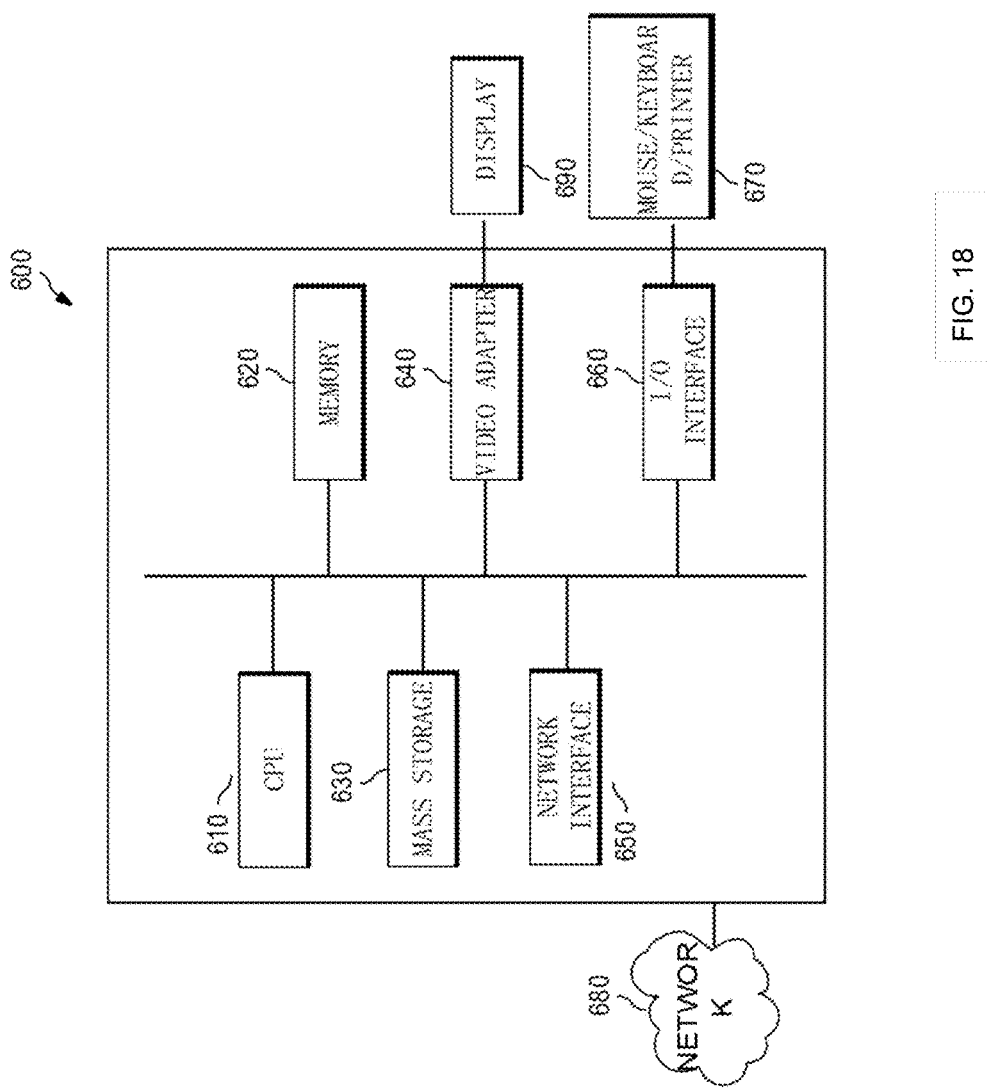
FIG. 18 is a schematic diagram illustrating an exemplary structure of an apparatus according to an embodiment.

As described above in example 1 one LUT can used for group of QPs. To cover the possible QP range the predefined QP set is used and one LUT is generated for each QP from the set. The FIG. 15 illustrates example of filter transfer functions depending on five QPs in the set and corresponding tables (from 0 to 4). In this example the table 4 is generated using method described in FIGS. 12-13 with straight-line auxiliary function crossing x-axis at the value of 11; and table 3 is generated using same method with straight-line auxiliary function crossing x-axis at the value of 9. The tables used in this example have values according to:
- table0={0, 2, 10, 19, 28, 36, 45, 53, 61, 70, 78, 86, 94, 102, 110, 118,},
- table1={0, 0, 5, 12, 20, 29, 38, 47, 56, 65, 73, 82, 90, 98, 107, 115,},
- table2={0, 0, 1, 4, 9, 16, 24, 32, 41, 50, 59, 68, 77, 86, 94, 103, },
- table3={0, 0, 0, 1, 3, 5, 9, 14, 19, 25, 32, 40, 55, 73, 91, 110,},
- table4={0, 0, 0, 0, 0, 1, 2, 4, 6, 8, 11, 14, 26, 51, 77, 102,}, As described above in example 2 the method of table subsampling can drop N bits from table values to reduce table size. As also mentioned in example 2 N may be different depending on QP used for certain table generation and selected THR value for this table. For example for lower QP values the filtering parameter a is relatively lower than for higher QPs. Thus the absolute value of THR can be reduced without sacrificing of performance. Furthermore to keep table size same for all QPs in the set (that is beneficial for simplifying implementation) and reduce subsampling rate for lower QPs (which correspond for less compression level and better reconstructed picture quality) it may be beneficial to reduce the amount of dropped bits N in comparison to other QP tables, e.g. by setting N for lover QP equal to 2 and setting THR to 64. The FIG. 16 illustrates example of filter transfer functions for five QPs in the set based on corresponding tables (from 0 to 4) with N set to 2 for first table (corresponding to lover QP range) and N set to 3 for other tables. This example also includes method of using AuxiliaryFunction for table 3 and table 4 generation as described above. For table 4 straight-line auxiliary function crosses the x-axis at the value of 11. For table 4 straight-line auxiliary function crosses the x-axis at the value of 9. The tables used in this example have values according to:
- table0={0, 0, 2, 6, 10, 14, 19, 23, 28, 32, 36, 41, 45, 49, 53, 57,},
- table1={0, 0, 5, 12, 20, 29, 38, 47, 56, 65, 73, 82, 90, 98, 107, 115,},
- table2={0, 0, 1, 4, 9, 16, 24, 32, 41, 50, 59, 68, 77, 86, 94, 103,},
- table3={0, 0, 0, 1, 3, 5, 9, 14, 19, 25, 32, 40, 55, 73, 91, 110,},
- table4={0, 0, 0, 0, 0, 1, 2, 4, 6, 8, 11, 14, 26, 51, 77, 102,}, As described above in example 2 the method of table subsampling can drop N bits from table values to reduce table size. As also mentioned in example 2 N may be different depending on QP used for certain table generation and selected THR value for this table. For example for higher QP values the filtering parameter a is relatively higher than for lower QPs that may require on increase THR value to keep equation (2) closer to 1. At the same time to keep LUT size same for all QPs in the set (which is beneficial due to simplification of implementation) and also considering that for higher QP values reconstructed picture has more distortions and increasing subsampling of LUT is acceptable due to subjectively unnoticeable effect of LUT subsampling in presence of strong compression artifacts the value N of least significant bitts dropped may be increased to 4 e.g. for last and for second last table in the set. FIG. 17 illustrates example of filter transfer functions for five QPs in the set based on corresponding tables (from 0 to 4) with N set to 2 for first table (table 0 corresponding to lover QP range), N set to 4 for last and second last table (table 3 and table 4) and N set to 3 for other tables. In this example TRH is set to 64 for first table generation, set to 256 for last end second last table and set to 128 for rest tables. This example also includes method of using AuxiliaryFunction for table 3 and table 4 generation as described above. For table 4 straight-line auxiliary function crosses the x-axis at the value of 6. For table 4 straight-line auxiliary function crosses the x-axis at the value of 8. The tables used in this example have values according to:
- table0={0, 0, 2, 6, 10, 14, 19, 23, 28, 32, 36, 41, 45, 49, 53, 57,},
- table1={0, 0, 5, 12, 20, 29, 38, 47, 56, 65, 73, 82, 90, 98, 107, 115,},
- table2={0, 0, 1, 4, 9, 16, 24, 32, 41, 50, 59, 68, 77, 86, 94, 103,},
- table3={0, 0, 3, 9, 19, 32, 47, 64, 81, 99, 117, 135, 154, 179, 205, 230,},
- table4={0, 0, 0, 2, 6, 11, 18, 27, 38, 51, 64, 96, 128, 160, 192, 224,}, FIG. 18 is a block diagram of an apparatus 600 that can be used to implement various embodiments. The apparatus 600 may be the encoding apparatus as shown in FIG. 1 and the decoding apparatus as shown in FIG. 2. Additionally, the apparatus 600 can host one or more of the described elements. In some embodiments, the apparatus 600 is equipped with one or more input/output devices, such as a speaker, microphone, mouse, touchscreen, keypad, keyboard, printer, display, and the like. The apparatus 600 may include one or more central processing units (CPUs) 610, a memory 620, a mass storage 630, a video adapter 640, and an I/O interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage 630 includes any type of storage device that stores data, programs, and other information and to make the data, programs, and other information accessible via the bus. The mass storage 630 includes, for example, one or more of a solid state drive, hard disk drive, a magnetic disk drive, an optical disk drive, or the like.

The video adapter 640 and the I/O interface 660 provide interfaces to couple external input and output devices to the apparatus 600. For example, the apparatus 600 may provide SQL command interface to clients. As illustrated, examples of input and output devices include a display 690 coupled to the video adapter 640 and any combination of mouse/keyboard/printer 670 coupled to the I/O interface 660. Other devices may be coupled to the apparatus 600, and additional or fewer interface cards may be utilized. For example, a serial interface card (not shown) may be used to provide a serial interface for a printer.

The apparatus 600 also includes one or more network interfaces 650, which includes wired links, such as an Ethernet cable or the like, and/or wireless links to access nodes or one or more networks 680. The network interface 650 allows the apparatus 600 to communicate with remote units via the networks 680. For example, the network interface 650 may provide communication to database. In an embodiment, the apparatus 600 is coupled to a local-area network or a wide-area network for data processing and communications with remote devices, such as other processing units, the Internet, remote storage facilities, or the like.

Proposed design of in-loop filter or prediction filter has the following advantages in respect to conventional adaptive filtering methods such as ALF:

The proposed frequency domain filter derives filtering parameters (frequency domain gain coefficients) from reconstructed frame or predicted block on the decoder side and so filtering parameters is not required to be transferred from encoder to decoder side.

ALF requires complex rate distortion optimization (RDO) on the encoder side for decreasing number of weighted coefficients for transmission. Proposed method does not require complex RDO on the encoder side (no parameters transferring) and applied for all blocks which satisfy the predefined conditions ALF is linear filter in pixel domain. The proposed filter is non-linear because gain coefficient for each 1D spectrum component depends on this spectrum component value. It allows to achieve additional coding gain from non-linear processing.

ALF requires universal multipliers on the decoder side. In proposed method filtering can be implemented as lookup table, because gain for each spectrum coefficient is less one. Therefore the proposed method can be implemented without any multiplication.

Thus, the filter is provided allowing improving the efficiency for video coding with low complexity.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A method, implemented by a coding device, for processing a block associated with an image or a video, comprising:

scanning, according to a predefined scan template, to obtain a current pixel of the block and neighboring pixels of the current pixel, wherein the block is a reconstructed block or a predicted block of the image or the video;

obtaining spectrum components by performing a transform for the current pixel and the neighboring pixels of the current pixel, wherein the transform is a Hadamard transform;

determining whether a filter is to be applied to the spectrum components obtained by performing the Hadamard transform based on one or more conditions;

when the filter is to be applied to the spectrum components, obtaining filtered spectrum components based on a filtering parameter and the spectrum components;

when the filter is not to be applied to the spectrum components, saving the spectrum components without changing;

obtaining filtered pixels by performing an inverse transform on the filtered spectrum components; and generating a filtered block based on the filtered pixels.

2. The method of claim 1, wherein the filtering parameter or the predefined scan template depends on the one or more conditions.

3. The method of claim 1, wherein the filter is applied if the size of the block obtained as a block width multiplied by a block height is greater than 4×4; or the filter is applied if the prediction mode of the block is an inter prediction mode and the block has a non-zero residual signal; or the filter is applied if the prediction mode of the block is an intra prediction mode.

4. The method of claim 1, wherein the filter is not applied if the prediction mode of the block is an inter prediction mode and both a block width and a block height are greater or equal to 32.

5. The method of claim 4, wherein the obtaining the filtered spectrum components comprises estimating the filtered spectrum components based on a look up table (LUT).

6. The method of claim 5, wherein a filtered spectrum component $F(i,\sigma)$ is estimated by:

$$F(i, \sigma) = \begin{cases} R(i), & \text{Abs}(R(i)) \geq THR \\ LUT(R(i), \sigma), & R(i) > 0 \\ -LUT(-R(i), \sigma), & R(i) \leq 0 \end{cases}$$

wherein i is an index of a spectrum component, R(i) is the spectrum component corresponding to index i, $\sigma$ is the filtering parameter, LUT is an array representing the look up table, and THR is a threshold.

7. The method of claim 6, wherein $$LUT(R(i), \sigma) = \frac{R(i)^3}{R(i)^2 + m * \sigma^2},$$

and m is a normalization constant equal to a number of spectrum components.

8. The method of claim 5, wherein the filtering parameter is derived based on a codec quantization parameter (QP).

9. The method of claim 8, wherein the filtering parameter σ is derived by $$\sigma = k * 2^{(n*(QP-s))},$$

wherein QP is the codec quantization parameter, and k, n and s are constants.

10. The method of claim 9, wherein k is modified based on a bit depth of pixels $k_{mod} = k*(1<<(bit\_depth-8))$ and $k_{mod}$ is used to replace k to derive the filtering parameter σ.

11. The method of claim 10, wherein the filtering parameter is equal to zero if QP<=17, and the block is bypassed without filtering.

12. The method of claim 6, wherein the THR is dependent of a QP value.

13. The method of claim 12, the THR is derived by:

$$\frac{THR^2}{THR^2 + m*\sigma^2} = C$$

wherein C is a value close to 1.

14. The method of claim 1, wherein the predefined scan template is defined as a set of spatial or raster offsets relative to a position of the current pixel inside the reconstructed block.

15. The method of claim 14, wherein when the predefined scan template is defined as a set of raster offsets relative to the position of the current pixel inside the reconstructed block, the set of raster offsets point to neighbor pixels that are inside the reconstructed block.

16. The method of claim 1, wherein the filtered pixels are added to an accumulation buffer according to the predefined scan template, and wherein the accumulation buffer is initialized by zero before the obtaining filtered spectrum components.

17. The method of claim 16, wherein final filtered pixels are obtained as accumulated values in the accumulation buffer divided by respective numbers of pixels added to respective positions of the accumulation buffer; and
wherein generating the filtered block is performed based on the final filtered pixels.

18. The method of claim 1, wherein the one or more conditions include at least one of:
the block has a non-zero residual signal,
a size of the block,
an aspect ratio of the block,
a prediction mode of the block,
a prediction mode of the block in intra, or
a prediction mode of the block in inter.

19. An apparatus of a video encoder or a video decoder, comprising:
a memory comprising instructions; and
one or more processors in communication with the memory, wherein the one or more processors execute the instructions to:
scanning, according to a predefined scan template, to obtain a current pixel of a block and neighboring pixels of the current pixel, wherein the block is a reconstructed block or a predicted block;
obtaining spectrum components by performing a transform for the current pixel and the neighboring pixels of the current pixel, wherein the transform is a Hadamard transform;
determining whether a filter is to be applied to the spectrum components obtained by performing the Hadamard transform based on one or more conditions;
when the filter is to be applied to the spectrum components, obtaining filtered spectrum components based on a filtering parameter and the spectrum components;
when the filter is not to be applied to the spectrum components, saving the spectrum components without changing;
obtaining filtered pixels by performing an inverse transform on the filtered spectrum components; and
generating a filtered block based on the filtered pixels.

20. The apparatus of claim 19, wherein the one or more conditions include at least one of:
the block has a non-zero residual signal,
a size of the block,
an aspect ratio of the block,
a prediction mode of the block,
a prediction mode of the block in intra, or
a prediction mode of the block in inter.

* * * * *